United States Patent
Bromand et al.

(10) Patent No.: US 11,081,111 B2
(45) Date of Patent: Aug. 3, 2021

(54) SYSTEMS AND METHODS FOR ENHANCING RESPONSIVENESS TO UTTERANCES HAVING DETECTABLE EMOTION

(71) Applicant: Spotify AB, Stockholm (SE)

(72) Inventors: Daniel Bromand, Stockholm (SE); David Gustafsson, Stockholm (SE); Richard Mitic, Stockholm (SE); Sarah Mennicken, San Francisco, CA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/821,140

(22) Filed: Mar. 17, 2020

(65) Prior Publication Data

US 2020/0219511 A1 Jul. 9, 2020

Related U.S. Application Data

(63) Continuation of application No. 15/958,510, filed on Apr. 20, 2018, now Pat. No. 10,621,983.

(51) Int. Cl.
*G10L 15/22* (2006.01)
*G10L 25/63* (2013.01)
(Continued)

(52) U.S. Cl.
CPC .............. *G10L 15/22* (2013.01); *G06F 3/167* (2013.01); *G06F 40/109* (2020.01);
(Continued)

(58) Field of Classification Search
None
See application file for complete search history.

(56) References Cited

U.S. PATENT DOCUMENTS 5,860,064 A * 1/1999 Henton ................. G10L 13/033
704/260
6,731,307 B1 5/2004 Strubbe et al.
(Continued)

FOREIGN PATENT DOCUMENTS

CN 106251871 A 12/2016
WO 2007/098560 A1 9/2007
(Continued)

OTHER PUBLICATIONS

A. Davletcharova et al., "Detection and Analysis of Emotion From Speech Signals," Procedia Computer Sci. Journal, 58, pp. 91-96 (2015).

(Continued)

*Primary Examiner* — Thuykhanh Le
(74) *Attorney, Agent, or Firm* — Merchant & Gould P.C.

(57) ABSTRACT

Methods, systems, and related products that provide emotion-sensitive responses to user's commands and other utterances received at an utterance-based user interface. Acknowledgements of user's utterances are adapted to the user and/or the user device, and emotions detected in the user's utterance that have been mapped from one or more emotion features extracted from the utterance. In some examples, extraction of a user's changing emotion during a sequence of interactions is used to generate a response to a user's uttered command. In some examples, emotion processing and command processing of natural utterances are performed asynchronously.

14 Claims, 8 Drawing Sheets

(51) Int. Cl.
  *G10L 15/02*    (2006.01)
  *G10L 15/26*    (2006.01)
  *G10L 13/10*    (2013.01)
  *G06F 3/16*     (2006.01)
  *G10L 13/033*   (2013.01)
  *G06F 40/109*   (2020.01)

(52) U.S. Cl.
  CPC .......... *G10L 13/0335* (2013.01); *G10L 13/10* (2013.01); *G10L 15/02* (2013.01); *G10L 15/26* (2013.01); *G10L 25/63* (2013.01); *G10L 2015/223* (2013.01)

(56) References Cited

U.S. PATENT DOCUMENTS

| | | |
|---|---|---|
| 7,590,538 B2 | 9/2009 | St. John |
| 8,954,317 B1 | 2/2015 | Fisher et al. |
| 9,020,825 B1* | 4/2015 | Garber .................. G06F 3/0485 704/275 |
| 9,659,068 B1* | 5/2017 | Mattsson ............... G06F 16/637 |
| 9,788,777 B1 | 10/2017 | Knight et al. |
| 9,812,151 B1* | 11/2017 | Amini ...................... G10L 15/26 |
| 9,820,004 B1* | 11/2017 | Foerster .............. H04N 21/8126 |
| 9,881,603 B2* | 1/2018 | Kim ........................ G10L 13/10 |
| 2002/0194002 A1 | 12/2002 | Petrushin |
| 2003/0023444 A1 | 1/2003 | St. John |
| 2004/0006476 A1* | 1/2004 | Chiu .................. H04M 3/4936 704/270.1 |
| 2004/0024602 A1* | 2/2004 | Kariya ................... G10L 13/08 704/270 |
| 2004/0064602 A1 | 4/2004 | George |
| 2006/0074651 A1 | 4/2006 | Arun |
| 2007/0214471 A1* | 9/2007 | Rosenberg .............. H04H 60/33 725/24 |
| 2008/0147413 A1* | 6/2008 | Sobol-Shikler ....... G10L 13/033 704/278 |
| 2009/0024393 A1* | 1/2009 | Kaneyasu ............. G10L 13/033 704/260 |
| 2009/0037946 A1* | 2/2009 | Chang ................ H04N 21/4756 725/24 |
| 2009/0100098 A1* | 4/2009 | Feher .................. G06F 16/3326 |
| 2011/0112671 A1* | 5/2011 | Weinstein .......... H04N 21/4755 700/94 |
| 2011/0196677 A1* | 8/2011 | Deshmukh .............. G10L 15/22 704/246 |
| 2011/0244954 A1* | 10/2011 | Goldman ................ A63F 13/53 463/30 |
| 2012/0016208 A1* | 1/2012 | Janssen ................ G06F 16/636 600/300 |
| 2012/0204202 A1* | 8/2012 | Rowley .................... A63F 13/40 725/12 |
| 2012/0215538 A1 | 8/2012 | Cleasby et al. |
| 2012/0226706 A1* | 9/2012 | Choi ........................ G06F 16/68 707/752 |
| 2012/0232886 A1* | 9/2012 | Capuozzo ................ G10L 15/22 704/9 |
| 2013/0024408 A1* | 1/2013 | Firminger ............... G06Q 10/06 706/17 |
| 2013/0030812 A1* | 1/2013 | Kim ...................... G06Q 50/01 704/270 |
| 2013/0035941 A1* | 2/2013 | Kim .................... H04N 21/431 704/275 |
| 2013/0103386 A1* | 4/2013 | Zhang .................... G06F 40/30 704/9 |
| 2013/0183944 A1* | 7/2013 | Mozer ................... H04L 12/282 455/414.1 |
| 2013/0238331 A1* | 9/2013 | Mikan .................. H04M 1/72436 704/235 |
| 2013/0297297 A1* | 11/2013 | Guven ................... G10L 25/63 704/204 |
| 2013/0305270 A1* | 11/2013 | Polack ................ H04N 21/4756 725/13 |
| 2013/0346078 A1 | 12/2013 | Gruenstein et al. |
| 2014/0039871 A1 | 2/2014 | Crawford |
| 2014/0112556 A1 | 4/2014 | Kalinli-Akbacak |
| 2014/0140497 A1* | 5/2014 | Ripa .................. H04M 3/5133 379/265.06 |
| 2014/0163960 A1* | 6/2014 | Dimitriadis ............. G10L 25/48 704/9 |
| 2014/0172431 A1 | 6/2014 | Song et al. |
| 2014/0195252 A1* | 7/2014 | Gruber .................... G10L 15/22 704/275 |
| 2014/0220526 A1* | 8/2014 | Sylves ............... G06Q 30/0201 434/238 |
| 2014/0244264 A1* | 8/2014 | Thirumalainambi ........................ G06F 40/242 704/270 |
| 2014/0278400 A1* | 9/2014 | Coussemaeker .... G06F 16/9535 704/235 |
| 2014/0278438 A1 | 9/2014 | Hart et al. |
| 2014/0330559 A1 | 11/2014 | Higbie et al. |
| 2014/0365226 A1 | 12/2014 | Sinha |
| 2015/0040012 A1* | 2/2015 | Faaborg ............. G06F 3/04817 715/728 |
| 2015/0053781 A1* | 2/2015 | Nelson ................... F24F 11/30 236/1 C |
| 2015/0058416 A1 | 2/2015 | Felt |
| 2015/0066479 A1* | 3/2015 | Pasupalak ............... G10L 15/30 704/9 |
| 2015/0074698 A1* | 3/2015 | Pinto ................... H04N 21/6582 725/14 |
| 2015/0120465 A1* | 4/2015 | Baldwin ............. H04L 63/1466 705/14.67 |
| 2015/0142486 A1* | 5/2015 | Broady ................. G06Q 10/0631 705/7.12 |
| 2015/0148013 A1 | 5/2015 | Baldwin et al. |
| 2015/0186780 A1* | 7/2015 | Zhang .................. G06K 9/00885 706/12 |
| 2015/0242518 A1* | 8/2015 | Rosenbaum ........... G06Q 50/01 707/710 |
| 2015/0297109 A1* | 10/2015 | Garten ................... A61B 5/375 600/544 |
| 2015/0310849 A1* | 10/2015 | Onishi ................... G10L 13/027 704/258 |
| 2016/0014263 A1* | 1/2016 | Carrico ............. H04M 1/72463 455/418 |
| 2016/0019202 A1 | 1/2016 | Adams et al. |
| 2016/0019915 A1 | 1/2016 | Khan et al. |
| 2016/0026621 A1* | 1/2016 | Misra .................... G06F 40/30 704/9 |
| 2016/0042226 A1* | 2/2016 | Cunico ................... G06N 5/022 382/103 |
| 2016/0042281 A1* | 2/2016 | Cunico ................... G06K 9/00221 706/11 |
| 2016/0042881 A1 | 2/2016 | Nishida et al. |
| 2016/0162807 A1* | 6/2016 | Smailagic ................ G10L 25/63 706/12 |
| 2016/0163332 A1* | 6/2016 | Un ...................... G06F 16/90332 704/260 |
| 2016/0287166 A1* | 10/2016 | Tran ...................... A61B 5/165 |
| 2016/0379622 A1* | 12/2016 | Patel ..................... G10L 13/033 704/260 |
| 2017/0004828 A1 | 1/2017 | Lee et al. |
| 2017/0055895 A1* | 3/2017 | Des Jardins ........... G16H 40/67 |
| 2017/0068423 A1* | 3/2017 | Napolitano .......... G06F 3/04842 |
| 2017/0154055 A1* | 6/2017 | Dimson ............... G06F 16/5838 |
| 2017/0160813 A1* | 6/2017 | Divakaran ............ G06K 9/00221 |
| 2017/0164051 A1* | 6/2017 | Han ...................... H04N 21/4436 |
| 2017/0206913 A1* | 7/2017 | Nahman ................. A61B 5/369 |
| 2017/0213190 A1* | 7/2017 | Hazan ................... G06Q 10/1053 |
| 2017/0244834 A1 | 8/2017 | Flores et al. |
| 2017/0308267 A1* | 10/2017 | Kozloski ................ G06F 3/04812 |
| 2017/0339089 A1* | 11/2017 | Longdale ............... A63F 13/63 |
| 2017/0352070 A1* | 12/2017 | DeLuca ................. G06K 9/6254 |
| 2017/0358302 A1* | 12/2017 | Orr ...................... G06F 16/433 |
| 2017/0368343 A1 | 12/2017 | Jones et al. |
| 2018/0018961 A1 | 1/2018 | Lee et al. |
| 2018/0032611 A1* | 2/2018 | Cameron ................ G06K 9/723 |
| 2018/0032884 A1 | 2/2018 | Murugeshan et al. |

(56) References Cited

U.S. PATENT DOCUMENTS

| | | | |
|---|---|---|---|
| 2018/0053503 A1* | 2/2018 | Ogunyoku | G08B 25/016 |
| 2018/0068226 A1 | 3/2018 | O'Connor et al. | |
| 2018/0075876 A1* | 3/2018 | Chintalapoodi | G11B 27/034 |
| 2018/0082679 A1* | 3/2018 | McCord | G10L 13/033 |
| 2018/0122361 A1* | 5/2018 | Silveira Ocampo | G10L 13/033 |
| 2018/0165582 A1* | 6/2018 | Cha | G06Q 30/00 |
| 2018/0165696 A1* | 6/2018 | Bessen | G06F 40/279 |
| 2018/0173796 A1* | 6/2018 | Murata | G06K 9/00845 |
| 2018/0240459 A1* | 8/2018 | Weng | G10L 15/22 |
| 2018/0254041 A1* | 9/2018 | Harper | G16H 40/67 |
| 2018/0257236 A1* | 9/2018 | Sasagawa | G10L 15/08 |
| 2018/0276478 A1* | 9/2018 | Cun Ico | G06K 9/00751 |
| 2018/0288481 A1* | 10/2018 | Goyal | G09B 5/065 |
| 2018/0300751 A1* | 10/2018 | Hammitt | G06N 3/08 |
| 2018/0314879 A1* | 11/2018 | Khwaja | A61B 5/0295 |
| 2018/0315414 A1* | 11/2018 | Hardee | G10L 15/22 |
| 2018/0322870 A1* | 11/2018 | Lee | G10L 15/26 |
| 2018/0331839 A1* | 11/2018 | Gao | G06Q 10/107 |
| 2018/0336796 A1* | 11/2018 | Delis | A61B 5/7435 |
| 2018/0336904 A1* | 11/2018 | Piercy | G10L 15/22 |
| 2018/0357286 A1 | 12/2018 | Wang et al. | |
| 2018/0358005 A1 | 12/2018 | Tomar et al. | |
| 2018/0367860 A1* | 12/2018 | Schmidt | H04N 21/4316 |
| 2019/0043493 A1* | 2/2019 | Mohajer | G10L 15/1822 |
| 2019/0065960 A1* | 2/2019 | Taylor | G06N 3/086 |
| 2019/0164555 A1* | 5/2019 | Chen | G10L 15/22 |
| 2019/0180089 A1* | 6/2019 | Wang | G06F 3/04842 |
| 2019/0197755 A1* | 6/2019 | Vats | G06T 13/205 |
| 2019/0253558 A1* | 8/2019 | Haukioja | H04M 3/5175 |
| 2019/0266999 A1* | 8/2019 | Chandrasekaran | G09B 5/00 |
| 2019/0306105 A1* | 10/2019 | Snibbe | G10L 15/30 |
| 2019/0318219 A1* | 10/2019 | Arora | G06N 3/006 |

FOREIGN PATENT DOCUMENTS

| | | |
|---|---|---|
| WO | 2017/044260 A1 | 3/2017 |
| WO | 2017/218243 A2 | 12/2017 |

OTHER PUBLICATIONS

De Pessemier et al., "Intuitive Human-Device Interaction for Video Control and Feedback," Broadband Multimedia Systems and Broadcasting (BMSB), 2017 IEEE Int'l Symposium on, pp. 1-7 (2017).

* cited by examiner

SYSTEMS AND METHODS FOR ENHANCING RESPONSIVENESS TO UTTERANCES HAVING DETECTABLE EMOTION

CROSS-REFERENCE TO RELATED APPLICATIONS

This application claims the benefit of Ser. No. 15/958,510, filed Apr. 20, 2018 in the United States and which application is incorporated herein by reference. To the extent appropriate, a claim of priority is made to the above disclosed application.

TECHNICAL FIELD

The present disclosure relates to technical solutions for utterance-based user interfaces.

BACKGROUND

Voice interfaces determine whether an audible utterance includes a command and how to behave in response. Typically, a response to an uttered command is an execution of that command, whether in the form of a verbal response or in the form of an action executing the command, or both. For instance, a response to the uttered command "What is the temperature outside?" could be the audible and/or displayed textual verbalization "seventy-five degrees". As another example, a response to the uttered command, "Play 'Yesterday' by the Beatles" could be an action executing the command; i.e., to play the song "Yesterday" with a media playing device and/or to verbalize, audibly and/or textually, a confirmation of the command execution being performed, e.g., "playing 'Yesterday' by the Beatles."

Whether the command is executed or not (the latter could occur if, e.g., the command is misinterpreted or unintelligible), the quality of the response can be deficient. Deficiencies in response quality include, for example, insensitivity in the response to one or more emotions detectable in the utterance that includes the command, and/or a time delay between the utterance and the fulfillment of the command included in the utterance. Systems that process both language and emotion can take longer to respond to uttered commands than systems processing language but not emotion, which can frustrate the user issuing the command. Another deficiency can be a response that fails to take into account detectable emotion from past interactions when responding to a present utterance.

WO2017044260A1 describes receiving an audio input containing a media search request, determining a primary user intent corresponding to the media search request, and determining one or more secondary user intents based on one or more previous user intents.

WO2017218243A2 describes a system for adapting an emotion text-to-speech model. A processor receives training examples comprising speech input and labelling data comprising emotion information associated with the speech input. Audio signal vectors are extracted from training examples to generate an emotion-adapted voice font model based on the audio signal vectors and the labeling data.

CN106251871A describes combining emotion recognition and voice recognition to improve home music playing.

US20160019915A1 describes recognizing emotion in audio signals in real time. If for a given audio signal a threshold confidence score for one or more particular emotions is exceeded, the particular emotion or emotions are associated with that audio signal.

US20140172431A1 describes playing music based on speech emotion recognition.

US20140112556A1 describes using sensors and a processor to analyze acoustic, visual, linguistic, and physical features from signals with machine learning algorithms and extracting an emotional state of a user by analyzing the features.

WO2007098560A1 describes extracting an emotional state from an input data stream from a user.

Davletcharova et. al., "Detection and Analysis of Emotion from Speech Signals," Procedia Computer Science (2015) (https://arxiv.org/ftp/arxiv/papers/1506/1506.06832.pdf) describes experiments relating to detecting the emotional state of a person by speech processing techniques.

U.S. Pat. No. 7,590,538B2 describes recognizing voice commands for manipulating data on the internet, including detecting the emotion of a person based on a voice analysis.

US20020194002A1 describes detecting emotion states in speech signals using statistics. Statistics or features from samples of the voice are calculated from extracted speech parameters. A neural network classifier assigns at least one emotional state from a finite number of possible emotional states to the speech signal.

U.S. Pat. No. 9,788,777B1 describes identifying an emotion that is evoked by media using a mood model.

De Pessemier et. al., "Intuitive Human-Device Interaction for Video Control and Feedback," (https://biblio.ugent.be/publication/8536887/file/8536893.pdf) describes speech and emotion recognition using machine learning.

SUMMARY

The present disclosure provides systems, methods, and computer readable products for enhanced utterance-based user interfaces using detectable emotions.

The systems, methods, and computer readable products of the present disclosure serve a variety of technical advantages and improvements over existing computer technologies and, particularly, over existing computer technologies directed to automatic speech recognition (ASR) and interactions with users that involve ASR.

For example, aspects of the methods, systems, and computer readable products of the present disclosure serve the technical advantage of improving how a machine processes and generates a response to a human's emotion.

Additional aspects of the methods, systems, and computer readable products of the present disclosure serve the further technical advantage of improving how a machine processes and generates a response to an utterance of a user that is unintelligible but nevertheless conveys an emotion.

Additional aspects of the methods, systems, and computer readable products of the present disclosure serve the further technical advantage of improving (e.g., improving efficiency) how a machine processes an utterance from a user that contains both a command and an emotion.

Still additional aspects of the methods, systems, and computer-readable products of the present disclosure serve the further technical advantage of improving how a machine learns to interact with a user, based on how the users' emotions have changed during prior sequences of interactions with the machine. Any of these technical advantages, as well as other technical advantages provided by the methods, apparatuses, and computer readable products of the present disclosure, enhances the machine's functionality and thereby enhances a machine's ability to satisfy a user of that machine.

In general terms, one aspect of the present disclosure provides for verbal (written and/or audible) acknowledgement of a natural utterance that is adapted to one or more detected emotions in the natural utterance. Another aspect of the present disclosure provides for verbal (written and/or audible) acknowledgement of a natural utterance that is adapted to one or more detected emotions in the natural utterance, even when the language of the utterance is not understood. Another aspect of the present disclosure provides for performing an action in response to a natural utterance, where the action responds to an inferred command in the natural utterance, the command being inferred based on one or more detected emotions in the natural utterance even when a command cannot be extracted from words of the natural utterance. Another aspect of the present disclosure provides for forking utterance processing into at least language processing and emotion processing performed asynchronously. Another aspect of the present disclosure provides for detecting a pivot between detected emotions in a sequence of interactions. Another aspect of the present disclosure provides for adapting a response to an utterance based on a detected pivot from a prior sequence of interactions.

As used herein, an "utterance-based user interface" or "UBSI" is an interface through which a human can interact with a non-human system by speaking/vocalizing.

As used herein, a "natural utterance" is a human vocalization or an equivalent human-initiated audible communication detectable by a microphone of a non-human system that includes a user device. Equivalents to human vocalizations include human speech initiated by a human neural network but generated by a speech synthesizer. Thus, for example, an utterance made by a human through a speech synthesizer is considered a "natural utterance" for purposes of this disclosure.

As used herein, a "synthesized utterance" is speech containing at least one word and/or audio cue that is audible to a human and produced by a non-human system. A synthesized utterance is not a natural utterance, and a natural utterance is not a synthesized utterance. As used herein, a "synthesized utterance" can include a text-to-speech (TTS) audible verbalization, one or more audio cues (e.g., an audible stylization), or a combination of a TTS audible verbalization and one or more audio cues.

As used herein, "utterance" includes both natural utterances and synthesized utterances.

As used herein, a "user" is a human.

As used herein, a "user device" is any device that provides an utterance-based user interface as defined herein. Non-limiting examples of user devices include smart phones, tablets desktop computers, laptop computers, cell phones, or any specialized appliance, e.g., media-playing specialized appliances having an utterance-based user interface as defined herein.

As used herein, a "a sequence of interactions" includes at least a first natural utterance, followed by an action performed by a non-human system in response to the first natural utterance, followed by a second natural utterance in response to the action.

As used herein, an "action" is an execution or attempted execution of a command that has been uttered in a natural utterance.

As used herein, an "emotion feature" is an attribute or a cue from a natural utterance or natural utterance portion that conveys an implication of the natural utterance/natural utterance portion other than meaning of language itself. In some examples, the implication of an emotion feature is, e.g., a feeling of the user, or simply any desire of the user making the utterance other than that the uttered command be executed. Non-limiting examples of feelings corresponding to emotion features of a natural utterance include surprise, anger, fear, anxiety, disgust, joy, sadness, and neutral feeling (a "neutral feeling" emotion feature conveys that the associated utterance/utterance portion does not imply any of the other feelings). Non-limiting examples of desires corresponding to emotion features of a natural utterance include humorous/playful, rushed, relaxed/laid back, amorous, and neutral desire (a "neutral desire" emotion feature conveys that the associated utterance/utterance portion does not imply any of the other desires).

For example, a humorous/playful user may desire to be teased or told a joke when their command is acknowledged and/or executed; a rushed user may desire an acknowledgement of the command to be brief (in number of words and/or pace at which the acknowledgement is uttered) or non-existent; a relaxed/laid back user may desire their command to be acknowledged gently, e.g., with a soothing tone, cadence, volume, and/or pitch, and/or uttered relatively slowly; an amorous user may want to be acknowledged with a seductive-sounding acknowledgement, etc.

In some embodiments of the present disclosure, a method comprises: receiving, via a user device, a natural utterance from a user, the natural utterance including a command; extracting the command; extracting an emotion feature from the natural utterance; mapping the emotion feature to an emotion; and responding to the natural utterance at least by executing the command and providing a synthesized utterance and/or displaying a text acknowledging the command, the synthesized utterance and/or text being adapted to the emotion.

The emotion feature is extracted from one or more of a variety of cues associated with the natural utterance. Non-limiting examples of such cues include a cadence or inflection in the natural utterance, a volume of the utterance, a pitch of the utterance, one or more words in the natural utterance, and a pace of the natural utterance (e.g., number of words or syllables or phonemes uttered per second).

Prior to mapping the emotion feature to an emotion, the emotion feature, in some examples, is first associated with a specific user, forming a user-emotion feature pair. Thus, for example, a particular emotion feature (e.g., a natural utterance pace of at least 5 words per second) is first associated with the user who uttered the utterance having that particular emotion feature, and the user-emotion feature pair is then mapped to an emotion, e.g., rushed. For another user (e.g., one who generally speaks at a relatively quick rate), the same emotion feature (a natural utterance pace of at least 5 words per second) is mapped to a different emotion, e.g., neutral desire.

In one illustrative example of the foregoing method, a user's natural utterance including the command "Play my favorite song" is received; one or more emotion features associated with the natural utterance is/are extracted from the words of the natural utterance and/or the tone/cadence/volume/pitch/pace of the natural utterance; the one or more emotion features are paired with the user and the user-emotion feature pairs are mapped to the emotion of sadness. A synthesized utterance acknowledging the command is then provided that is adapted to the sadness emotion (e.g., "You seem a little down. Playing your favorite song"); and the user's favorite song is played (e.g., by locating a song from the user's playlists that has been played more than any other song on the user's playlists). The synthesized utterance has one or more emotion features adapted to the detected emotion (sadness), including, e.g., the words of the synthesized utterance ("You seem a little down") and the cadence of the synthesized utterance (uttered in a synthesized sympathetic cadence).

The adaptation of the synthesized utterance acknowledgment or text acknowledgment is in some examples user-specific. Thus, for example, an acknowledgment of a natural utterance of a first user having a detected sadness emotion is to acknowledge sympathetically ("You seem a little down), while an acknowledgement of a natural utterance of a second user having a detected sadness emotion is to acknowledge forcefully ("Snap out of it!").

In some embodiments of the present disclosure, a non-transitory computer readable medium comprises: an emotion processor having one or more sequences of emotion processor instructions that, when executed by one or more processors, causes the one or more processors to generate an output adapted to a detected emotion in a natural utterance from a user; and one or more sequences of instructions that, when executed by one or more processors, cause the one or more processors to: receive the natural utterance via a user device, the natural utterance including a command; extract the command; extract an emotion feature from the natural utterance; optionally pair the emotion feature with the user; map the emotion feature or the emotion feature-user pair to an emotion; and respond to the natural utterance by executing the command and providing one or both of a synthesized utterance acknowledging the command and/or displaying a text acknowledging the command, wherein the synthesized utterance and/or the text is/are adapted to the detected emotion.

In some embodiments of the present disclosure a method comprises: receiving, via a user device, a natural utterance from a user, the natural utterance including a command that is not extracted; extracting an emotion feature from the natural utterance; optionally, pairing the emotion feature with the user; mapping the emotion feature or the emotion feature-user pair to an emotion; and responding to the natural utterance at least by providing a synthesized utterance acknowledging the natural utterance, the synthesized utterance being adapted to the emotion.

In one illustrative example of the foregoing method, a user's natural utterance including an undetectable command "Hi! Plymfang!" is received; emotion features based on the cadence and pace of the natural utterance are extracted from the natural utterance and paired with the user. Each of the emotion feature-user pairs is then mapped to an emotion. The cadence emotion feature is mapped to a joyful emotion. The pace emotion feature is mapped to a rushed emotion. Then, a synthesized utterance acknowledging that the command could not be extracted is provided, where the synthesized utterance is adapted to one or both of the joyful emotion and the rushed emotion.

The adapting of the synthesized utterance is in some examples specific to the user. Thus, for example, for this user, the synthesized utterance is adapted to the detected joyful emotion by providing an acknowledgement with an excited tone/cadence, and the synthesized utterance is adapted to the detected rushed emotion by including fewer than a threshold number of words, e.g., "Missed that! Please repeat!"

In some embodiments of the present disclosure, a non-transitory computer readable medium comprises: an emotion processor having one or more sequences of emotion processor instructions that, when executed by one or more processors, causes the one or more processors to generate an output adapted to an emotion in a natural utterance of a user; and one or more sequences of instructions that, when executed by one or more processors, cause the one or processors to: receive, via a user device, the natural utterance, the natural utterance including an unextractable command; extract an emotion feature from the natural utterance; optionally, pair the emotion feature with the user; map the emotion feature or the user-emotion feature pair to an emotion, and respond to the natural utterance by providing one or both of a synthesized utterance acknowledging that the command could not be extracted and displaying a text acknowledging that the command could not be extracted, wherein the synthesized utterance and/or the text is adapted to the emotion.

In some embodiments of the present disclosure a method comprises: receiving, via a user device, a natural utterance from a user; extracting an emotion feature from the natural utterance; pairing the emotion feature with the user; mapping the emotion feature or the emotion feature-user pair to an emotion; inferring from the emotion an intended command; and responding to the natural utterance at least by one or both of: 1) performing an action corresponding to the intended command; and 2) providing a synthesized utterance or other verbalization acknowledging the natural utterance, the verbalization/synthesized utterance indicating the inferred command being performed and/or being adapted to the emotion.

In one illustrative example of the foregoing method, a user's natural utterance "Ugh", having no words from which a command can be extracted, is received; emotion features based on the tone of the natural utterance are extracted from the natural utterance and paired with the user. Each of the emotion feature-user pairs is then mapped to an emotion. The tone emotion feature is mapped to an angry/frustrated emotion. An intended command of "stop playing the current song" is inferred from the angry/frustrated emotion, and playback of the currently playing song is stopped/paused, even though the command "stop playing the current song" was not detected in the language of the natural utterance.

Thus, in some examples the inferred command is determined based partially on an action already performed or currently being performed, such as the playback of a particular song. That is, the natural utterance is assumed to be responding to an already performed or currently performed action.

The inferring is in some examples specific to the user. Thus, for example, for this user, the action corresponding to the inferred command is adapted to the detected frustrated emotion by pausing song playback because this user is known, e.g., from past interactions, to express anger/frustration when listening to an undesirable song.

In some embodiments of the present disclosure, a non-transitory computer-readable medium comprises: an emotion processor having one or more sequences of emotion processor instructions that, when executed by one or more processors, causes the one or more processors to generate an output adapted to an emotion in a natural utterance of a user; and one or more sequences of instructions which, when executed by one or more processors, causes the one or processors to: receive a natural utterance from a user; extract an emotion feature from the natural utterance; pair the emotion feature with the user; map the emotion feature or the emotion feature-user pair to an emotion; infer an intended command based on the emotion; and respond to the natural utterance at least by one or both of: 1) performing an action corresponding to the intended command; and 2) providing a synthesized utterance or other verbalization acknowledging the natural utterance, the synthesized utterance or other verbalization indicating the inferred command being performed and/or being adapted to the emotion.

In some embodiments of the present disclosure, a method comprises receiving, via a user device, a first natural utterance; extracting a first emotion feature from the first natural utterance; optionally, pairing the first emotion feature with the user; mapping the first emotion feature or the first emotion feature-user pair to a first emotion; executing a first action in response to the first natural utterance and/or generating a synthesized utterance and/or a displayed text proposing that the first action be executed or acknowledging that the first action will be executed; receiving a second natural utterance in response to the first action and/or the synthesized utterance or text; extracting a second emotion feature from the second natural utterance; optionally, pairing the second emotion feature with the user; mapping the second emotion feature or the second emotion feature-user to a second emotion; comparing the first emotion and the second emotion; identifying, based on the comparing, a pivot from the first emotion to the second emotion; classifying the pivot as one of positive, negative, and neutral; associating the pivot with a combination of the first natural utterance and the first action; and, optionally, receiving, subsequent to the second natural utterance, a third natural utterance from the user and performing a second action in response to the third natural utterance, the second action being selected based at least partially on the pivot.

In one illustrative example of the foregoing method, a user's first natural utterance including the command "Play me an uplifting song" is received and a first emotion feature (cadence) is extracted that is paired with the user and then mapped to a "neutral feeling" first emotion associated with the first natural utterance. In response to the first natural utterance, a synthesized utterance is generated proposing that a first action of playing the song "What a Wonderful World" by Louis Armstrong be executed. Following the synthesized utterance, the second natural utterance of "Yes!" is received from the user, and a second emotion feature (cadence or volume) is extracted that is paired with the user and mapped to a "joyful" second emotion associated with the second natural utterance. The first emotion (neutral feeling) and the second emotion (joyful) are compared and a positive pivot from the neutral first emotion to the joyful second emotion is identified and associated, for that user, with the combination of the natural utterance of "Play me an uplifting song" and the action of playing "What a Wonderful World" by Louis Armstrong. Optionally, subsequent to the identifying, classifying, and associating of the pivot, a third natural utterance of "Play me a happy song" is received from the user and, in response to the third natural utterance, the second action of playing "What a Wonderful World" by Louis Armstrong is executed, the second action being selected based on the positive pivot identified from the prior interaction.

In another illustrative example of the foregoing method, a user's first natural utterance including the command "Play me an uplifting song" is received, and a first emotion feature (cadence) is extracted that is paired with the user and then mapped to a "neutral" first emotion associated with the first natural utterance. In response to the first natural utterance, a first action of playing "You Are My Sunshine" by Jimmie Davis and Charles Mitchell is executed. Following the first action, the second natural utterance of "Whatever." is received and at least a second emotion feature (cadence and/or word choice) is extracted that is paired with the user and mapped to an "angry" second emotion associated with the second natural utterance. The first emotion and second emotion are compared and a negative pivot from the neutral first emotion to the negative second emotion is identified, classified, and associated, for that user, with the combination of the natural utterance of "Play me an uplifting song" and the action of playing "You Are My Sunshine" by Jimmie Davis and Charles Mitchell. Optionally, subsequent to the identifying, classifying, and associating of the pivot, a third natural utterance of "Play me an uplifting song" is received from the user and, in response to the third natural utterance, the second action of playing "What a Wonderful World" by Louis Armstrong is executed, the second action being selected based on the negative pivot identified from the prior interaction.

In some embodiments of the present disclosure, a non-transitory computer readable medium comprises: an emotion processor having one or more sequences of emotion processor instructions that, when executed by one or more processors, causes the one or more processors to generate an output adapted to a detected emotion in a natural utterance; and one or more sequences of instructions that, when executed by one or more processors, causes the one or more processors to: receive, via a user device, a first natural utterance from a user; extract a first emotion feature from the first natural utterance; optionally, pair the first emotion feature with the user; map the first emotion feature or the first emotion feature-user pair to a first emotion; execute a first action in response to the first natural utterance and/or generate a synthesized utterance and/or a displayed text proposing that the first action be executed or acknowledging that the first action will be executed; receive a second natural utterance in response to the first action and/or the synthesized utterance or text; extract a second emotion feature from the second natural utterance; optionally, pair the second emotion feature with the user; map the second emotion feature or the second emotion feature-user pair to a first emotion; identify a pivot between the first emotion and the second emotion; classify the pivot as one of positive, negative, and neutral; associate the pivot with the first natural utterance and the first action; and, optionally, receive, subsequent to the second natural utterance, a third natural utterance and perform a second action in response to the third natural utterance, the second action being selected based at least partially on the pivot.

In some embodiments of the present disclosure, a method comprises receiving a digital representation of a natural utterance via a user device, the natural utterance including a command and an emotion feature, feeding the digital representation into each of an emotion processor and a command processor; processing the digital representation with the emotion processor by extracting an emotion feature from the digital representation and mapping the emotion feature to an emotion; processing the digital representation with the command processor by extracting a command from the digital representation; and, optionally, executing the command and providing a command acknowledgment adapted to the emotion; wherein the processing of the digital representation with the emotion processor and the processing the digital representation with the command processor are performed asynchronously.

In an illustrative example of the foregoing method, a user device receives a natural utterance of "Play my heavy metal playlist" via a microphone and converts the natural utterance to a digital representation. The natural utterance and its digital representation include a command (play my heavy metal playlist) and an emotion feature (e.g., the user is an aggressive mood). The digital representation is fed into each of an emotion processor and a command processor. In the emotion processor, the digital representation is processed by extracting the emotion feature (aggressive mood) and mapping that emotion feature to an emotion (e.g., user desires to be energized). Asynchronously, in the command processor, the command "play my heavy metal playlist" is extracted from the digital representation. An acknowledgment of the command "Ready to get fired up?! Playing your heavy metal playlist!" (displayed as text and/or uttered as a synthesized utterance) is then provided, the acknowledgement being adapted to the emotion (user desires to be energized), and the command is executed, i.e., the user's heavy metal playlist is played.

In some embodiments of the present disclosure, a system comprises: a command processor and an emotion processor, the command processor being configured to receive a digital representation of a natural utterance and process the digital representation of the natural utterance by extracting a command from the digital representation, the emotion processor being configured to process the digital representation of the natural utterance by extracting an emotion feature from the digital representation and mapping the emotion feature to an emotion, wherein the processing by the command processor and the processing by the emotion processor are performed asynchronously.

In some embodiments of the present disclosure, a non-transitory computer-readable medium comprises: a command processor having one or more first sequences of instructions that, when executed by the command processor, causes the command processor to process a digital representation of a natural utterance by extracting a command from the digital representation; and an emotion processor having one or more second sequences of instructions that, when executed by the emotion processor, causes the emotion processor to process the digital representation of the natural utterance by extracting an emotion feature from the digital representation, wherein the one or more first sequences of instructions and the one or more second sequences of instructions are executed asynchronously.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers.

DETAILED DESCRIPTION

The example embodiments presented herein are directed to systems, methods, and non-transitory computer-readable medium products enhancing responsiveness to natural utterances having detectable emotion. This is for convenience only, and is not intended to limit the application of the present invention. After reading the following description, it will be apparent to one skilled in the relevant art how to implement the following disclosure in alternative embodiments.

Figure 1:
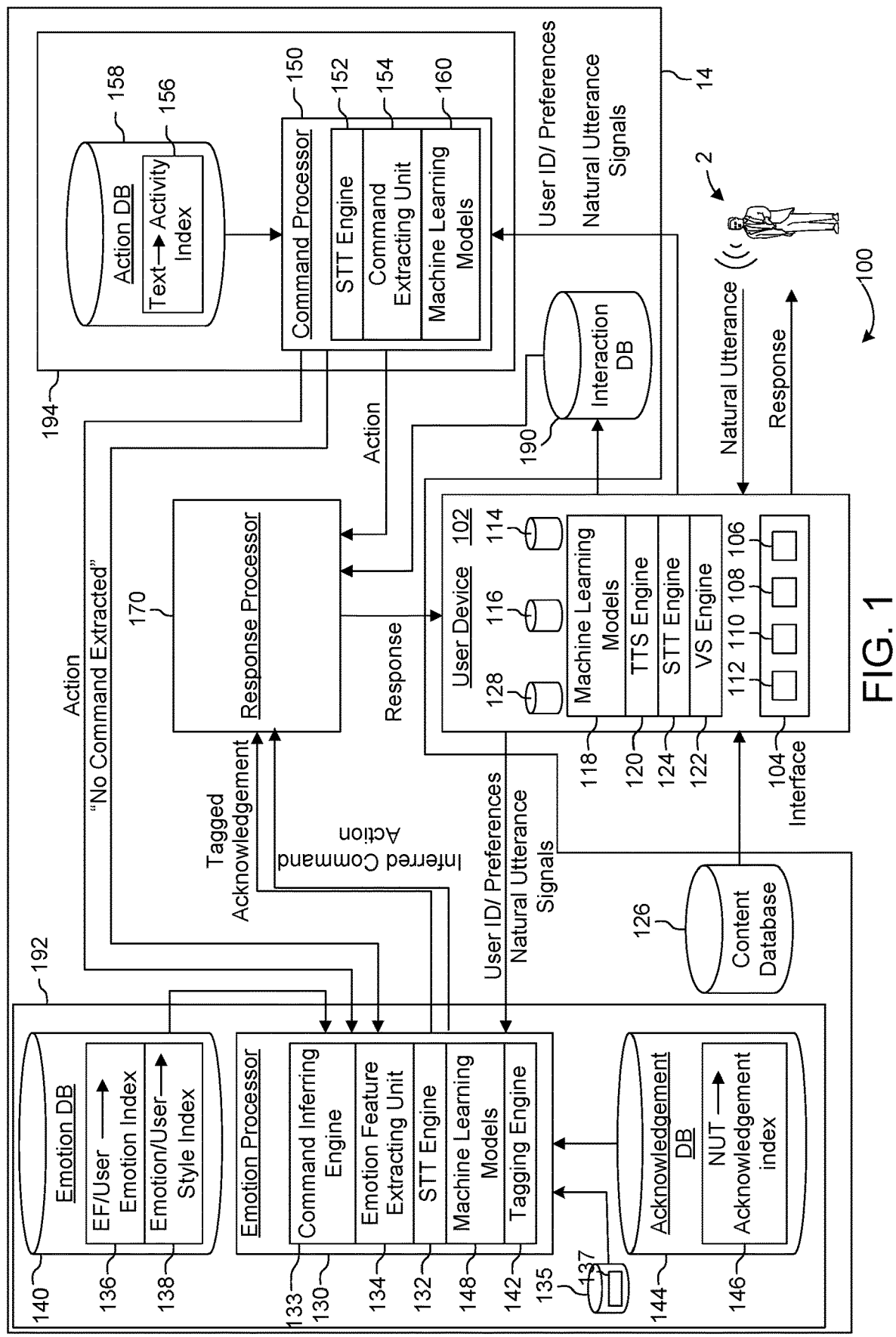
FIG. 1 depicts an example system for providing enhanced responsiveness to natural utterances having detectable emotion.

FIG. 1 illustrates an example system 100 for providing enhanced responsiveness to natural utterances having detectable emotion. Although each depicted component of the system 100 will be described, every component is not needed for every embodiment of the present disclosure. It should also be appreciated that the user 2 (a human) of the system 100, is not a part of the system 100, but rather interacts with the system 100.

Referring to FIG. 1, a user device 102 receives a natural utterance from the user 2. The user device 102 includes an interface 104 that enables the user 2 and the system 100 to interact. The interface 104 includes an audio input interface 106 (e.g., including a microphone and input amplifier) and an audio output interface 108 (e.g., including an audio output amplifier and a speaker). The audio input interface 106 receives sound waves corresponding to the user's natural utterances, and converts the sound waves into analog signals that the user device 102 converts into digital signals. The digital signals in some examples include a textual component and a non-textual component.

The audio output interface 108 provides sound waves that the user 2 can hear through, for example, a speaker. For example, the user device 102 generates audible acknowledgements of commands extracted from the user's natural utterances and outputs the audible acknowledgements through audio output interface 108. In some examples, the user device 102 can also perform actions commanded by the user, such as playing audible media content through the audio output interface 108 using a media playback device.

Optionally, the user device 102 also includes a display or graphical user interface 110 (e.g., LED or OLED display). The display can be adapted to display text and/or images. For example, the display can display textual acknowledgements of commands extracted from the user's natural utterances. In some examples, the user device 102 can also generate actions commanded by the user, and cause the display 110 to display the outside temperature in response to a natural utterance such as "What is the temperature?". In some examples the user device 102 is also adapted to play visual media content via display 110 in response to certain naturally uttered commands.

Optionally, the user device 102 can include one or more other interface components 112. In one example, such action-generating components can include a thermostat and/or other temperature controlling device and/or a heating/air conditioning vent, such that the user device 102 can adjust a heating/cooling feature in response to a command such as "Set the thermostat to 72 degrees" extracted from the natural utterance.

The user device 102 is configured to connect wirelessly or with one or more hard connections (e.g., Wi-Fi, cellular, Ethernet) to a network, such as a cloud network 14. The user device 102 includes one or more processors 114 for reading and executing computer readable instructions. The one or more processors 114 can execute instructions for performing actions associated with input or output of the interfaces 106, 108, 110, 112.

The user device 102 also includes at least one local storage 116 (e.g., a database) that, in some examples, stores data relating to the user 2 (e.g., user identity, preferences etc.) as well as other users who have or may use the user device 102, and also stores data relating to past interactions between the user 2 and the system 100. Thus, if the user device 102 is unable to connect to the network 14 it can, in some examples, process natural utterances received from the user 2 and respond to those natural utterances in part by retrieving, from the at least one local storage 116, data relating to how natural utterances from the user 2 were responded to in the past and perform processes using the one or more processor 114.

In some examples, described in more detail below, the user device 102 also includes one or more machine learning models 118 that use training algorithms to determine how to respond to a given natural utterance.

The user device 102 also includes a text-to-speech (TTS) engine 120. The TTS engine 120 is configured to convert textual components of synthesized utterances (e.g., text corresponding to a command acknowledgment) and non-textual components, e.g., emotion adaptations of a command acknowledgement (e.g., audible stylizations relating to volume, pitch, pace, etc.) into utterance signals that can be uttered as a synthetic utterance via the audio output interface 108.

In some examples, a verbal stylizing engine 122 (VS engine) works with the TTS engine to apply stylistic adjustments to utterance signals that can be uttered as a synthetic utterance via the audio output interface 108, thereby adapting the synthesized utterance to one or more emotions detected in a natural utterance. Non-limiting examples of stylistic adjustments adapted to emotions include adjustments in cadence, inflection, tone, volume, pitch, pace, emphasis, etc. Thus, for example, a textual component of a command acknowledgment is received in the TTS engine 120, the textual component including one or more stylistic tags, e.g., "quick" and "loud." Using the verbal stylizing engine 122, the TTS engine 120 feeds a speech signal to the audio output interface 108 that has been stylized according to the tags and thereby adapted to the user's emotion(s).

The VS Engine 122 is in some examples also configured to adjust the style of acknowledgment text displayed via the display 110 that is adapted to one or more emotions detected in the natural utterance. Non-limiting examples of text-based stylistic adjustments adapted to emotions include adjustments in font style, font size, font color, use of bold, italic or underlined text, punctuation (e.g., exclamation points), emphasis (e.g., all caps), etc. Thus, for example, text of a command acknowledgment is generated for displaying via display 110, the text including one or more stylistic tags, e.g., "excited". Using the verbal stylizing engine 122, text of the acknowledgement displayed via the display 110, the text having been stylized (e.g., ALL CAPS and 3 exclamation points !!!) according to the tags and thereby adapted to the user's emotion(s).

For certain actions to be performed in response to natural utterances, the user device 102 retrieves action content (e.g., media files) from a content database 126. The content database 126 can be remote from the user device 102. In addition or alternatively, the user device 102 can include a local storage 128 from which to obtain content to provide in response to certain uttered commands.

It should be appreciated that the user device 102 need not be a single physical unit or structure but could itself comprise a system of interconnected hardware, firmware and software. Thus, for example, the user device 102 corresponds to a combination of a smart phone or specialized hand-holdable device that is connected (through a hard connection or wireless connection) to an automobile's speakers, thermometer and thermostat. In other examples, the user device 102 is communicatively linked or linkable to hardware in another user environment such as a home, an office, another vehicle, any location where media playback could be desirable, etc.

Whether stylistic textual adjustments are appropriate can depend on the type of user device and whether text-based responses are appropriate for the user device. For example, for a user device that is used in an automobile, it can be advantageous for safety reasons to provide all verbalizations as synthesized utterances rather than displayable text.

Optionally, the user device 102 includes a speech-to-text (STT) engine 124 for converting an analog signal of the natural utterance into a digitalized textual component and/or digitalized non-textual component of the natural utterance which can be fed to a command processor 150. The STT engine 124 has ASR capabilities.

The natural utterance in analog and/or digital form is fed to an emotion processor 130 and a command processor 150.

In some examples, emotion processing and command processing of the natural utterance occur synchronously. In these examples, emotion processing and command processing are performed sequentially, i.e., they are not performed in parallel. In preferred examples, however, emotion processing and command processing are performed asynchronously, as described in more detail below.

In the example system 100, the emotion processor 130 and the command processor 150 are separate components, and the command processing and emotion processing of a natural utterance are performed asynchronously. Thus, first digital signals corresponding to the natural utterance are fed to the emotion processor 130 for emotion processing, and second digital signals corresponding at least to the textual component of the natural utterance are fed to the command processor 150. In some examples outputs from both the emotion processor 130 and the command processor 150 are fed to a response processor 170. Time can be saved by performing the command processing and emotion processing asynchronously, i.e., in parallel.

The system 100 includes an emotion subsystem 192 and a command subsystem 194. The emotion subsystem 192 includes system components relating to emotion processing, such as the emotion processor 130 and the corresponding instructions executable by the emotion processor. The command subsystem 194 includes system components relating to command processing, such as the command processor 150 and the corresponding instructions executable by the command processor. Emotion processing and command processing will next be described in greater detail.

Command Processing

The user device 102 feeds the command processor 150 signals corresponding to a natural utterance. In some examples, those signals have already been processed and partially converted into digitalized text by the local STT engine 124. In other examples, the command processor 150 converts the utterance signals to text via its own STT engine 152.

The user device 102 also feeds the command processor 150 information about the user 2, such as identifying information and/or preference information. In some examples such information is used by the command processor to look up the appropriate user-specific text-to-action index, as described in more detail below.

Once converted to text, the command extracting unit 154 attempts to extract a command from the textual component of the natural utterance. In some examples, the command extracting unit 154 looks up the textual component in a text-to-action index 156 residing on an action storage 158 (e.g., a database).

The text-to-action index 156 includes entries that map different strings of text to their corresponding actions to be executed in order to fulfill the command component of the natural utterance. The text-to-action index 156 is, in some examples, user-specific. That is, the mapping of the textual component of a natural utterance to action depends on the user who made the natural utterance. For example, the text-to-action-index for the user 2 can include an entry that maps the textual component "play my favorite song" to the action <play Yesterday by the Beatles> while the same textual component from a natural utterance of a different user is mapped to the action <play Hello by Adele>.

In some examples, a textual component of a natural utterance is mapped to an action by the command processor 150 by feeding the textual component to an algorithm that provides the appropriate action. For example, the textual component "play my favorite song" of a natural utterance is mapped to an algorithm that determines, for the user in question, which song they have listened to the most and then maps the textual component to the action of playing the song that is output by the algorithm. Such an algorithm can be stored on a storage accessed by the command processor 150.

If the textual component cannot be mapped to an action, i.e., a command cannot be extracted from the textual component of the natural utterance, which could be the case, e.g., if the natural utterance was not intelligible or for many other reasons, the command processor 150 provides an indication of a non-extractable command to the response processor 170 and/or to the emotion processor 130.

If the textual component is mapped to an action, the command processor 150 provides the response processor 170 and/or the emotion processor 130 with the action corresponding to the extracted command.

In some examples, the command processor 150 also includes one or more machine learning models 160 that use training algorithms to, e.g., improve command extraction from textual components of natural utterances and/or map extracted commands to actions generally or specifically depending on the user.

In some examples, the user is able to directly train the command processor 150, e.g., by inputting preferences via the interface 104 of the user device to program how particular commands should be mapped to actions.

Emotion Processing

Analog and/or digital signals corresponding to the textual component and the non-textual component of the natural utterance are fed to the emotion processor 130 along with information relating to the user 2 including, e.g., user-identifying information, user preference information, etc.

The signals corresponding to the natural utterance are processed by the emotion feature extracting unit (EFEU) 134.

If necessary, i.e., if not already performed by STT engine 124, a STT engine 132 of the emotion processor 130 also converts the signals into digitalized text which is then fed to the EFEU 134.

Thus, the EFEU 134 processes the natural utterance to extract one or more emotion features from the natural utterance. Emotion features can be extracted from the textual component of the natural utterance, i.e., the words that the user chose to use, and/or from a non-textual component of the natural utterance, such as volume, pitch, pace, cadence, inflection, etc.

Figure 3:
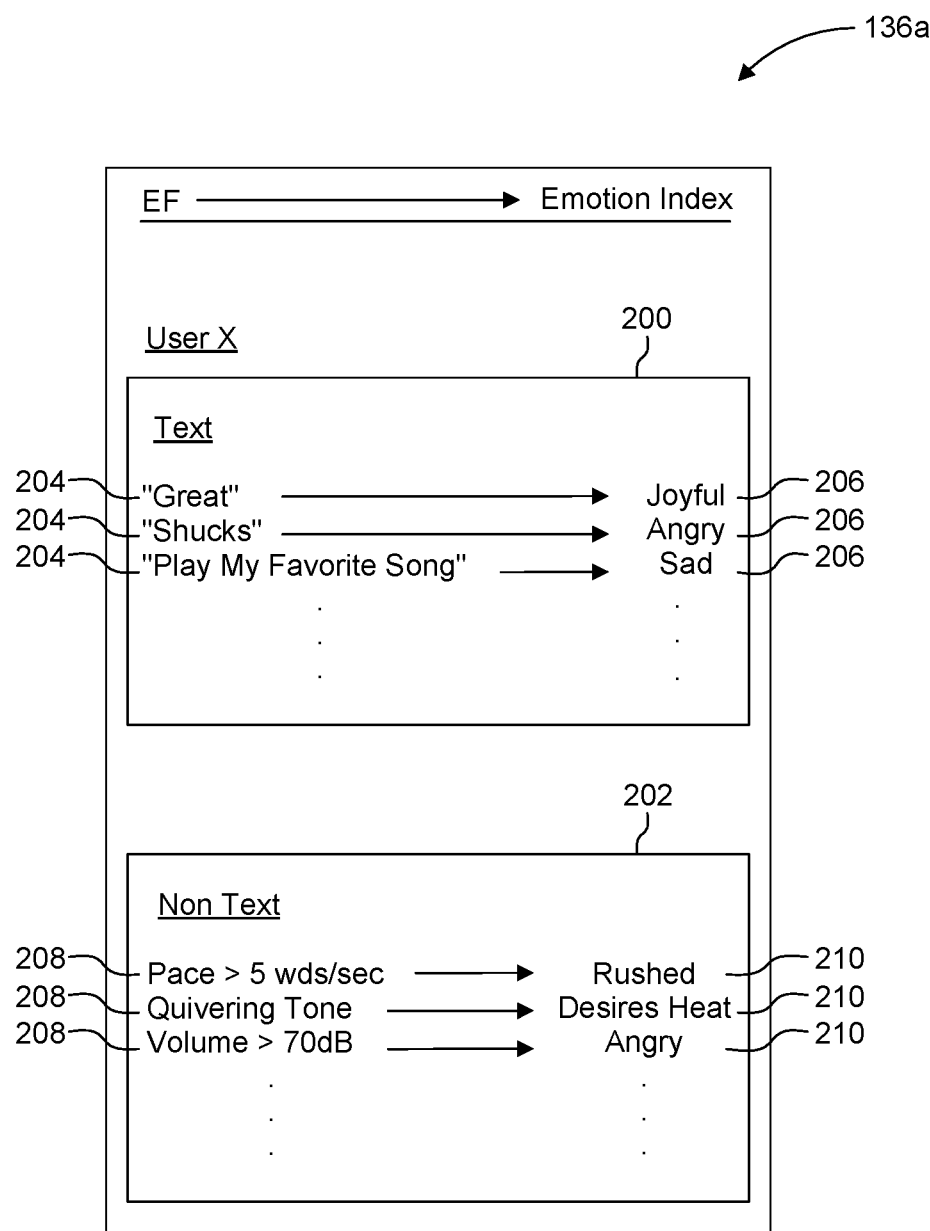
FIG. 3 schematically illustrates an index or look-up table that can be used by the emotion processor of the systems of FIG. 1 or 2.

In some examples, the EFEU 134 looks up an extracted emotion feature associated with the user who uttered the natural utterance in an emotion feature (EF)-to-emotion index 136 residing in an emotion storage 140, e.g., a database. An example EF-emotion index 136a is depicted in FIG. 3 and corresponds to a particular user, User X. The EF-emotion index 136a includes a textual component portion 200 and a non-textual component portion 202.

The textual component portion 200 maps textual component emotion features 204 of a natural utterance (e.g., letters, words, or strings of letters/words) to emotions 206 for the User X. That is, in the EF-emotion index 136a, the textual component emotion features 204 are paired with the User X. In this example, if the word "Great" is in the textual component of the natural utterance, that textual component emotion feature is mapped to a joyful emotion.

The non-textual component portion 202 maps non-textual component emotion features 208 of the natural utterance (e.g., pace, tone, volume, pitch, cadence, inflection etc.) to emotions associated with the User X. That is, in the EF-emotion index 136a, the non-textual component emotion features 208 are paired with the User X and mapped to corresponding emotions 210. In this example, if a volume greater than 70 dB is detected in the volume of the natural utterance, that non-textual component emotion feature is mapped to an angry emotion.

It should be appreciated that, for a given natural utterance, more than one emotion feature can be extracted from either or both textual components and non-textual components of that natural utterance.

It should also be appreciated that, for a given natural utterance, multiple emotion features can conflict with each other. As one example, the EFEU extracts from the natural utterance, "Why don't you make it even hotter in here?" a textual component emotion feature that maps to an emotion of desiring the heat to be increased, and a non-textual component emotion feature (sarcastic tone) that the user in fact desires the opposite, i.e., desires that the heat be switched off or the air conditioning switched on. In this example, the EFEU has extracted two conflicting emotion features. In some examples, when conflicting emotion features are extracted from a natural utterance, a conflict resolution engine of the emotion processor 130 is used to resolve the conflict and select the emotion feature from the conflicting emotion features for mapping to an emotion. In the example just provided, the conflict resolution engine resolves the conflict by determining, e.g., through machine learning models and/or user input preferences, that the sarcasm emotion feature dictates and is the extracted feature to be mapped to an emotion for the natural utterance in question.

Figure 4:
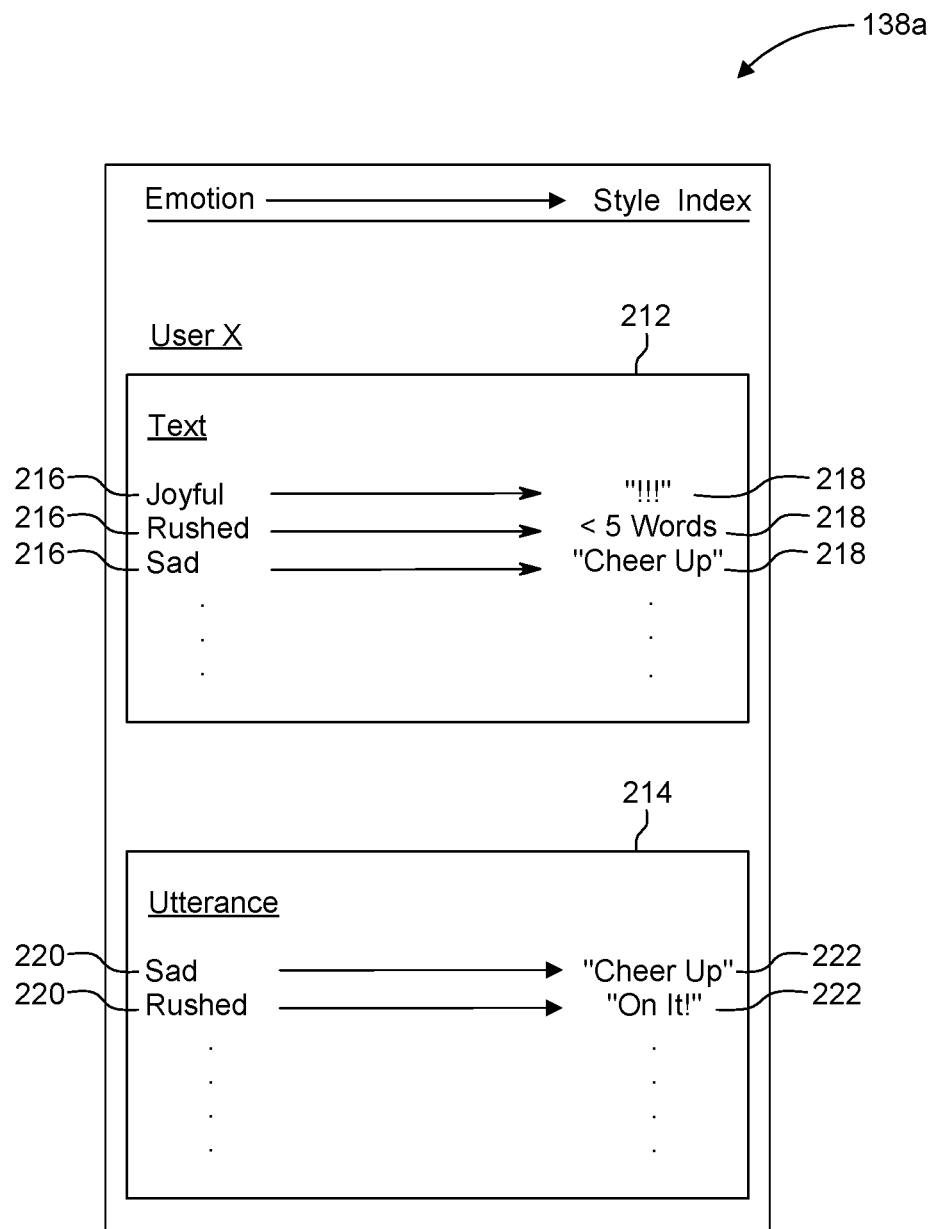
FIG. 4 schematically illustrates a further index or look-up table that can be used by the emotion processor of the systems of FIG. 1 or 2.

In some examples, the EFEU 134 then looks up each detected emotion in an emotion-style index 138, which is also specific to each user. An example emotion-style index 138a is depicted in FIG. 4. The emotion-style index 138a is specific to User X. Thus, for another user, a given emotion may map to a different stylization or adaptation than what is contained in the emotion-style index 138a.

The emotion-style index 138a includes a text portion 212 and an utterance portion 214. The text portion 212 corresponds to stylistic adaptations of text to be displayed to the user as part of the response to the natural utterance. The utterance portion 214 corresponds to stylistic adaptations of a synthesized utterance to be provided to the user as part of the response to the natural utterance.

It should be appreciated that responses can include just one or both of a textual component and/or a synthesized utterance component. Either or both components can be stylized, i.e., adapted to the emotion(s) detected in the natural utterance to which the response is directed.

The text portion 212 of the emotion-style index 138 maps detected emotions 216 to corresponding textual stylizations 218 for a text-based (or partially text-based) response to the natural utterance for the User X. Thus, for example, a rushed emotion detected for User X is mapped to a textual response that contains less than 5 words.

The utterance portion 214 of the emotion-style index 138 maps detected emotions 220 to corresponding utterance stylizations 222 for a synthesized utterance-based (or partially utterance-base) response to the natural utterance for the User X. Thus, for example, a rushed emotion detected for User X is mapped to a synthesized utterance response of "On it!".

The emotion processor 130 includes a tagging engine 142, which tags an acknowledgement retrieved from an acknowledgement database 144 with the one or more textual or utterance-based emotion adaptations obtained from the emotion-style index 138.

In some examples, the emotion processor 130 retrieves the appropriate acknowledgement to the natural utterance from a natural utterance text (NUT)-to-acknowledgement index 146 residing on the acknowledgement database 144. The NUT-to-acknowledgement index 146 is, in some examples, user-specific. That is, the mapping of a given textual component of a natural utterance to a corresponding acknowledgement of that textual component depends on the user.

The NUT-to-acknowledgement index 146 can also provide information regarding the appropriate format (text, synthesized utterance or both) of the acknowledgment for the user in question, and/or for the user device in question. For example, if the user device is associated with an automobile, the NUT-acknowledgement index 146 maps to a synthesized utterance of an acknowledgement so as not to distract the user with text in the event the user is driving the automobile.

Figure 5:
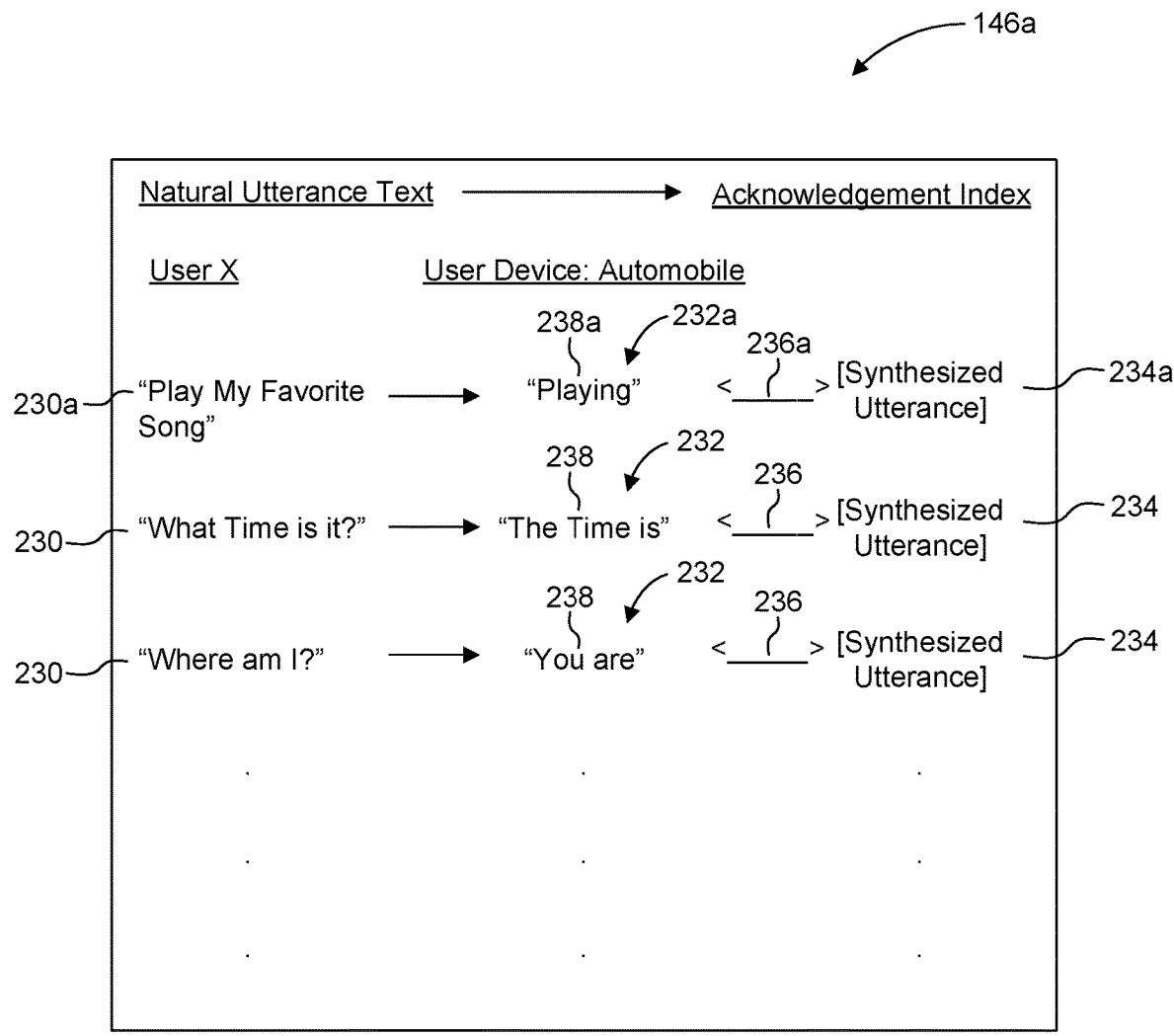
FIG. 5 schematically illustrates a further index or look-up table that can be used by the emotion processor of the systems of FIG. 1 or 2.

A specific example of a NUT-acknowledgement index 146a is depicted in FIG. 5. The NUT-acknowledgement index 146a is specific to the User X and to the user device through which the natural utterance was received (an automobile).

For the given user and user device, the NUT-acknowledgement index maps a textual component 230 of a natural utterance to an acknowledgement 232 having an associated format parameter 234 (text, synthesized utterance, or both). The acknowledgement 232 also includes a populated action placeholder 236 that is mapped to the action (or non-action) provided by the command processor 150 to complete the acknowledgement and tailor it to the command in question. For example, for the natural utterance textual component 230a, "Play my favorite song", the acknowledgement 232a includes the placeholder 236a populated with "Hello by Adele" extracted from the corresponding action provided by the command processor 150, and the acknowledgement 232a is associated with the format parameter Synthesized Utterance 234a.

Optionally the NUT-acknowledgement index also maps each natural utterance textual component to a command reflector 238 that is then paired with the populated action placeholder 236. The command reflectors 238 are derived by the emotion processor 130 and/or the command processor 150 from the textual component of the naturally uttered command. Any suitable algorithm can be performed to reflect the nature of the command in the command reflector 238. In one example algorithm, an operative command word or words (e.g., "play", "drive", "organize", "display", "turn up") detected in the textual component of the natural utterance is mapped to an appropriate conjugation of that operative command word(s). For example, "play" is mapped to "playing" in the command reflector 238a, corresponding to the natural utterance textual component 230a "Play my favorite song".

In some examples, which can depend on the extracted emotion features and their mapped emotions for a given user/user device, the acknowledgement 232 does not include a command reflector, even when the command has been understood. For example, the natural utterance textual component "Play my favorite song" is mapped to the acknowledgement "On it." for a user who is in a rush, which does not include a command reflector.

As an illustrative example of acknowledgment mapping, for the textual component "Play my favorite song" of a natural utterance of User X received via a user device 102 associated with an automobile, the emotion processor 130 provides to the response processor 170 the tagged acknowledgment: "Cheer up. Playing "Hello by Adele"" to be provided to the user as a synthesized utterance only (i.e., without an accompanying text acknowledgement) via the user device 102 and, more specifically, via the audio output interface 108. In this example, the tagging engine 142 tagged the appropriate acknowledgement (Playing <_>) looked up from the acknowledgement database 144 with the appropriate emotion adaption looked up from the emotion storage 140 and inserted the appropriate action object <Hello by Adele> provided by the command processor 150. The emotion processor 130 also applied a command reflector ("playing") to the acknowledgement.

As another illustrative example, for the textual component "Hi. Plymfang" of a natural utterance of User X received via a user device 102 associated with an automobile, and where an emotion feature (cadence) was extracted from the non-textual component of the natural utterance and mapped to a sad/sadness emotion, the emotion processor 130 provides to the response processor 170 the tagged acknowledgment: "Cheer up. I'm afraid I missed that." to be provided to the user as a synthesized utterance only (i.e., without an accompanying text in the acknowledgement) via the user device 102. In this example, the tagging engine 142 tagged the appropriate acknowledgement looked up from the acknowledgement database 144 with the appropriate emotion adaptation looked up in the emotion storage 140 and inserted the appropriate non-action provided by the command processor 150 which was unable to extract a command from the natural utterance.

In some examples, the emotion processor 130 also includes a command inferring engine 133. The command inferring engine 133 maps a detected emotion to an inferred command, e.g., by looking up a detected emotion for a given natural utterance in an emotion-inferred command (EIC) index 137 stored, e.g., on a command inference storage 135.

The mapping provided by the EIC index 137 depends on one or more factors, such as the user identity/preferences, the user device, a currently performed action, and/or a previously performed action. Thus, for example, a given detected emotion for a given user is mapped to an inferred command of "stop playback of the currently playing song" when the action being performed at the time of the natural utterance is playback of that song, while the same detected emotion for the same user is mapped to an inferred command of "turn off the heater" when the action being performed at the time of the natural utterance is an activated heater.

Once an emotion has been mapped to the inferred command, an action (e.g., pausing playback, turning off the heater) corresponding to the inferred command can be performed or caused to be performed by the response processor 170 and/or the user device 102. In addition to performing the action corresponding to the inferred command (e.g., pausing playback), the response to the natural utterance provided by the response processor 170 in some examples also includes an acknowledgment of the natural utterance that is adapted to the detected emotion and/or indicates or references the inferred command action being performed, e.g., "Sorry about that. Pausing playback".

In some examples the emotion processor 130 also includes one or more machine learning models 148 that use training algorithms to, e.g., improve emotion feature extraction from textual and non-textual components of natural utterances, and/or map extracted emotion features to emotions, and/or map textual and non-textual components of natural utterances to acknowledgements generally or specifically to the user and/or specific to the user device, and/or map detected emotions to inferred commands.

In some examples, the user is able to directly train the emotion processor 130, e.g., by inputting preferences via the interface 104 of the user device to program how particular natural utterances, textual components of natural utterances, or non-textual components of natural utterances should be mapped to emotions, emotion adaptations, acknowledgements, and/or acknowledgement formats, and how emotions should be mapped to inferred commands.

The response processor 170 receives the tagged acknowledgement from the emotion processor 130. If applicable, the response processor 170 also receives the inferred command action from the emotion processor 130 or the action from the command processor 150, and feeds them, i.e., feeds the response, to the user device 102. The user device 102 then provides the emotion-adapted acknowledgement in the appropriate format (text and/or utterance) via the interface 104. In some examples, the TTS engine is adapted to convert digital representations of the emotion adaptations to the speech it generates. For example, the TTS engine can be adapted, depending on the input it receives, to provide the synthesized utterance of "Cheer up. Playing "Hello by Adele"" in a flat tone or cadence or, depending on the emotion adaptation, another tone/cadence, such as melancholy, sympathetic, excited, joking, sarcastic, etc.

In some examples, the user device 102 also performs or causes to be performed the action, whether extracted by the command processor 150 or inferred by the emotion processor 130. For example, if the action/inferred action is to play a particular song, the user device 102 retrieves that song from the content database 126 or the local storage 128 and, via the processor 114, plays the song via the audio output interface 108. If the action/inferred action is to turn on the air conditioner, the processor 114 sends control signals to another actuator 112, e.g., a thermostat.

In some examples, the interaction between the user 2 and the system 100 is stored in an interaction storage 190 (e.g., a database). The interaction storage 190 is either local to the user device 102 or remote from the user device 102.

In some embodiments, information about emotions detected in multiple past natural utterances from a given user is stored in the interaction storage 190 and can be used, e.g., by the response processor 170, to adapt a current response to a natural utterance received subsequent to the multiple past natural utterances. For example, if at least a predefined minimum number N (e.g., at least 5) of past detected emotions for a given user are negative (e.g., angry) the response processor 170 is configured to craft a current or future response by not only adapting the response to an emotion detected in the current natural utterance, but to also incorporate something different into the response that had not been incorporated in the N past responses, such as performing a different action in response to a current or future command (e.g., recommending or selecting a different media item for playback) and/or providing a stylistically and/or verbally different command acknowledgment. For example, if the N past responses included synthetic utterances stylized with a consoling tone, the current response is a synthetic utterance stylized with an aggressive tone. In some examples, the emotion-style index 138 is then updated accordingly to reflect that, for the user in question, responses to angry natural utterances should not be stylized with a consoling tone.

In some embodiments, the interaction database 190 is used by the machine learning modules described herein.

In some embodiments, the interaction database 190 is involved in inferring commands based on detected emotions in natural utterances. In some embodiments, the interaction database 190 is involved in detecting pivots between detected emotions in sequences of interactions between users and the system 100. These embodiments will be described next.

Detecting Pivots and Adapting Responses to Pivots

Figure 2:
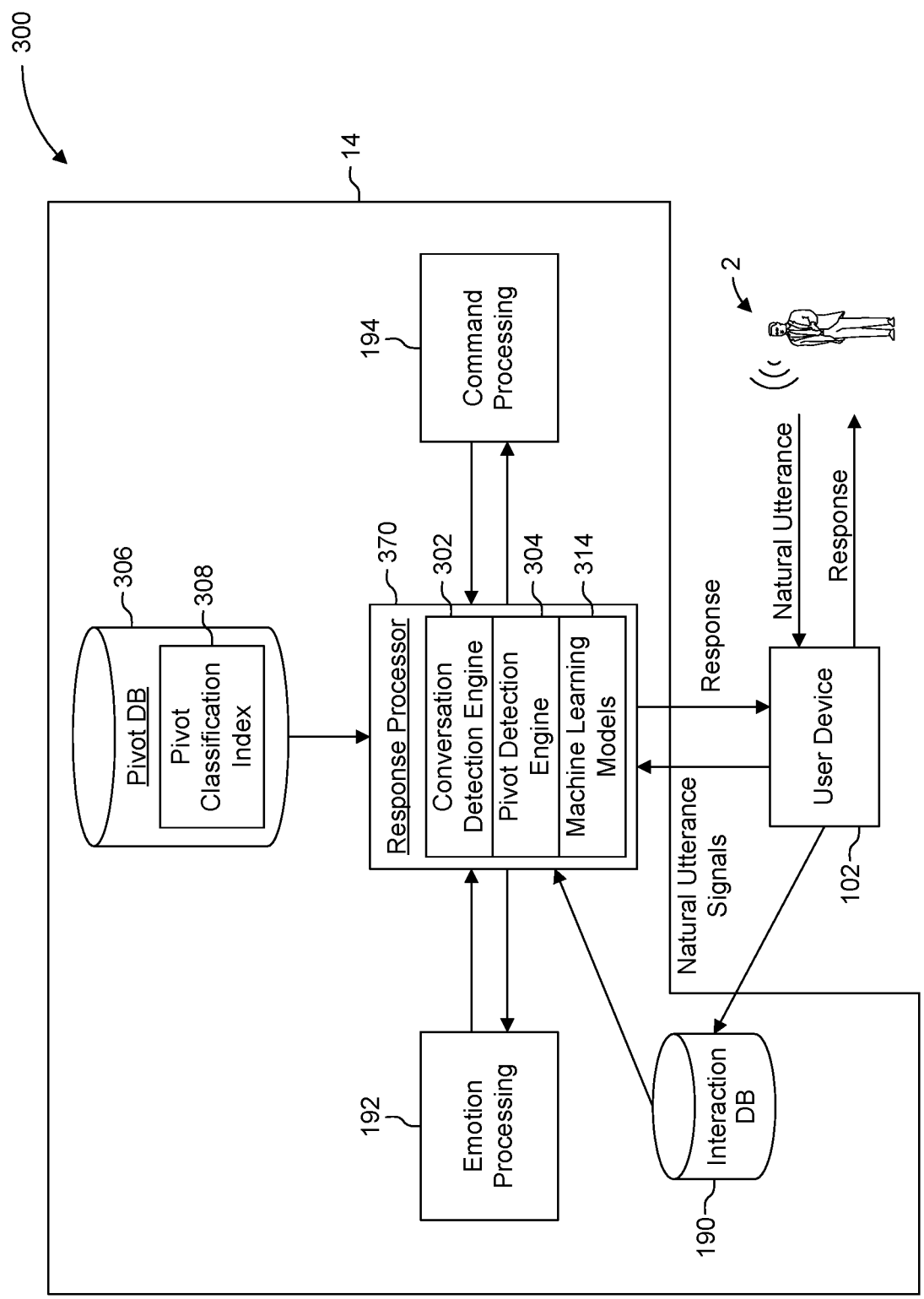
FIG. 2 depicts a further example system for providing enhanced responsiveness to natural utterances having detectable emotion.

Referring to FIG. 2, in an example system 300 a user 2 produces a natural utterance that is received by the user device 102. The natural utterance is processed and fed to the response processor 370, optionally via one or both of the command subsystem 194 and the emotion subsystem 192.

A conversation detection engine 302 is configured to detect if an utterance input from the user 2 is a sequence-opening utterance, i.e., an initial interaction with the system 300, or a sequence-continuing utterance, i.e., an utterance following the initial utterance in a related sequence of interactions between the user 2 and the system 300.

The conversation detection engine 302 uses one or more parameters or algorithms to determine if a given natural utterance is sequence-opening (SO) or sequence-continuing (SC).

For example, the conversation detection engine 302 identifies a time interval between the immediately prior response provided by the same user device 102 (which can be stored on the interaction database 190) and the current utterance. If the time interval exceeds a predefined threshold, the current utterance is classified as SO; if the time interval does not exceed the predefined threshold, the current utterance is classified as SC.

In some examples, even if the time interval does not exceed the threshold, prior to classifying the current utterance as SC, the conversation detection engine 302 first confirms or disconfirms that the identity of the user making the current utterance corresponds to the identity of the user for which the immediately prior response was provided. If, for example, the user has changed from the immediately prior response (user identity disconfirmed), the current utterance is classified as SO; if the user is the same as for the immediately prior response (user identity confirmed), the current utterance is classified as SC.

Classifying a current utterance as SO or SC is, in some examples, accomplished using additional and/or alternative algorithms from those just described. For example, text corresponding to the current utterance can be compared with the type of the immediately prior response to see if they are related. If the current utterance meets a predefined threshold of relatability to the type of the immediately prior response, the current utterance is classified as SC; if not, it is classified as SO. For example, a current natural utterance of "I love Adele" meets a predefined relatability threshold to an immediately prior response of playing "Hello" by Adele, such that the current natural utterance is classified as SC.

Current utterances classified as sequence-opening can be processed by the command subsystem 194 and the emotion subsystem 192 as described above, and those SO utterances and the responses generated thereto can be stored in the interaction database 190 for future retrieval by the response processor 370.

Current utterances classified as sequence-continuing can be paired with the preceding portion of the sequence retrieved from the interaction database (i.e., the immediately preceding response and the natural utterance that elicited the immediately preceding response) and then fed to a pivot detection engine 304.

The pivot detection engine 304 processes the sequence of interactions, which consists of at least two natural utterances and an intervening response. In processing the sequence of interactions, the pivot detection engine 304 works with the emotion subsystem 192 to compare emotion features or their corresponding mapped emotions from a prior (SO) natural utterance in the sequence with emotion features or their corresponding mapped emotions from the current (SC) natural utterance to determine if the sequence of interactions includes an emotion pivot, in which a change or inversion in emotion of the user is detected.

One example of a pivot is from joyful to sad. Another example pivot is from sad to joyful. Another example pivot is from angry to relaxed. Another example pivot is from relaxed to angry.

Once a pivot has been detected the pivot detection engine 304 then classifies the pivot, e.g., as one of positive, negative or neutral, although other classifications may be applicable. A neutral pivot actually indicates that there is no emotional change, but for purposes of this disclosure a neutral pivot is still considered a class of pivot. In some examples, the pivot detection engine 304 uses a pivot classification index 308 stored on a pivot database 306 to look up a classification for a given pair of SO utterance emotion and SC utterance emotion.

Figure 6:
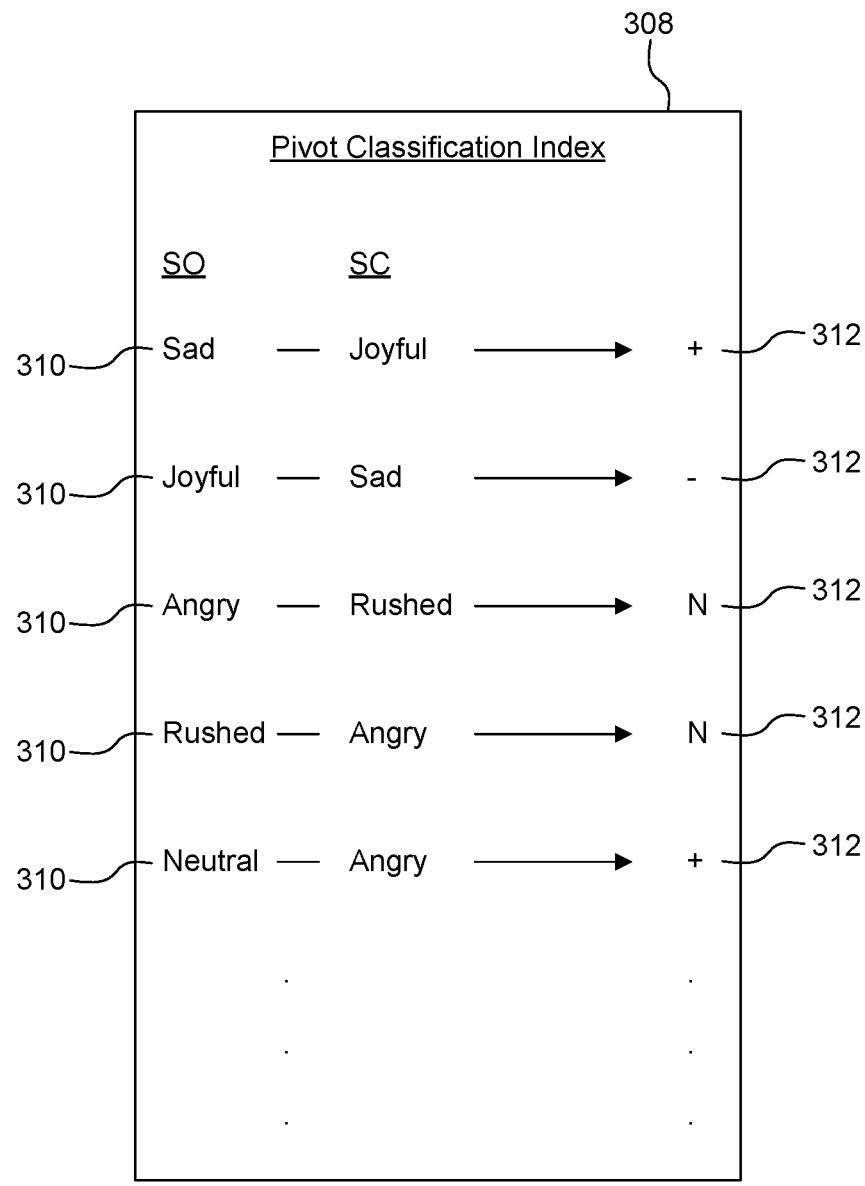
FIG. 6 schematically illustrates an index or look-up table that can be used by the response processor of the system of FIG. 2.

An example pivot classification index 308 is schematically illustrated in FIG. 6, where temporally related (SO utterance-SC utterance) pairings 310 are mapped to corresponding classifications 312 of positive, negative, or neutral. In some cases the SO utterance emotion and the SC utterance emotion will be unrelated to each other, as in the pairing of Angry-Rushed. In some examples, unrelated SO-SC emotions are classified by the response processor 370 as neutral.

Once a pivot has been identified and classified, for a subsequent SO or SC natural utterance that meets or exceeds a minimum threshold relatability to a prior sequence of interactions (stored in the interaction database 190) for which a pivot had been identified and classified, one of at least three processes occurs as described below.

Relatability can be ascertained according to any suitable algorithm performed by the response processor 370. For example, a new SO utterance and a prior sequence of interactions meet a threshold relatability to each other if a command extracted during the prior sequence of interactions matches a command extracted in the new SO utterance. Other parameters can also be analyzed to determine relatability between the past sequence of interactions and the new SO, such as user identity, time of day, user device, and time elapsed between the prior sequence of interactions and the new SO (for example, a time elapsed of at least six months could mean that the new SO does not meet a minimum threshold of relatability to the prior sequence).

As mention above, if sufficient relatability is established one of at least three processes occurs:

If the pivot classification from the prior interaction is neutral, in some examples the new natural utterance is treated as unrelated to the prior sequence and processed by the emotion subsystem 192 and the command subsystem 194 accordingly.

If the classification is positive, the response processor 370 and the emotion subsystem 192 cooperate to generate a response that matches one or more parameters of the response in the sequence immediately preceding the pivot, such as performing/causing to be performed the same action, and/or providing an emotion-adapted acknowledgement that matches or partially matches an acknowledgement of that prior response.

If the classification is negative, the response processor 370 and the emotion subsystem 192 cooperate to generate a response that differs in one or more parameters from the response in the prior sequence, such as performing/causing to be performed a different action than was provided in that response, and/or providing an emotion-adapted acknowledgement that differs in one or more attributes from an acknowledgement of that prior response.

The system 300 is not limited to processing interactions that include just two natural utterances and an intervening response. Longer sequences of interactions can also be stored (e.g., in the interaction database 190), and processed by the response processer 370 in a manner similar to that described above.

In some examples, multiple pivots are detected and/or classified in a given sequence of interactions between user and system, and appropriate responses generated accordingly.

In some examples one or more other algorithms is/are executed by the emotion subsystem 192 to evaluate longer sequences of interactions, e.g., sequences including at least a predetermined minimum number of related natural utterances and responses (e.g., at least two of each). One such example algorithm involves evaluating a sequence of interactions by comparing a number of positive, negative and neutral emotions detected in natural utterances during the course of the sequence in question. By counting and then comparing these numbers, e.g., by averaging them, a given sequence of interactions can be labeled as predominately positive, predominately negative, or neutral, and the response processor 370 can then adapt a subsequent response based, at least in part, on the applied label. For example, if the prior sequence is predominately negative, then the response processor 370 and the emotion subsystem 192 cooperate to generate a current or future response that differs in one or more parameters from the responses in the prior sequence. The differences in response can include, e.g., differences in the action performed in response to a command (e.g., which media item is recommended or selected for playback) and/or differences in how a natural utterance is acknowledged.

Evaluating emotions of users across sequences of interactions can also provide valuable feedback that can train the system 300 regarding the user's personality and preferences and thereby further improve user interactions with the system 300 in general.

In some examples, the response processor 370 also includes one or more machine learning models 314 that use training algorithms to, e.g., improve conversation detection, pivot detection, pivot classification, and/or pivot-adapted responses by the conversation detection engine 302 and the pivot detection engine 304.

In some examples, the user is able to directly train the response processor 370, e.g., by inputting preferences via the interface of the user device 102 to program how particular interaction sequences should be processed.

Figure 7:
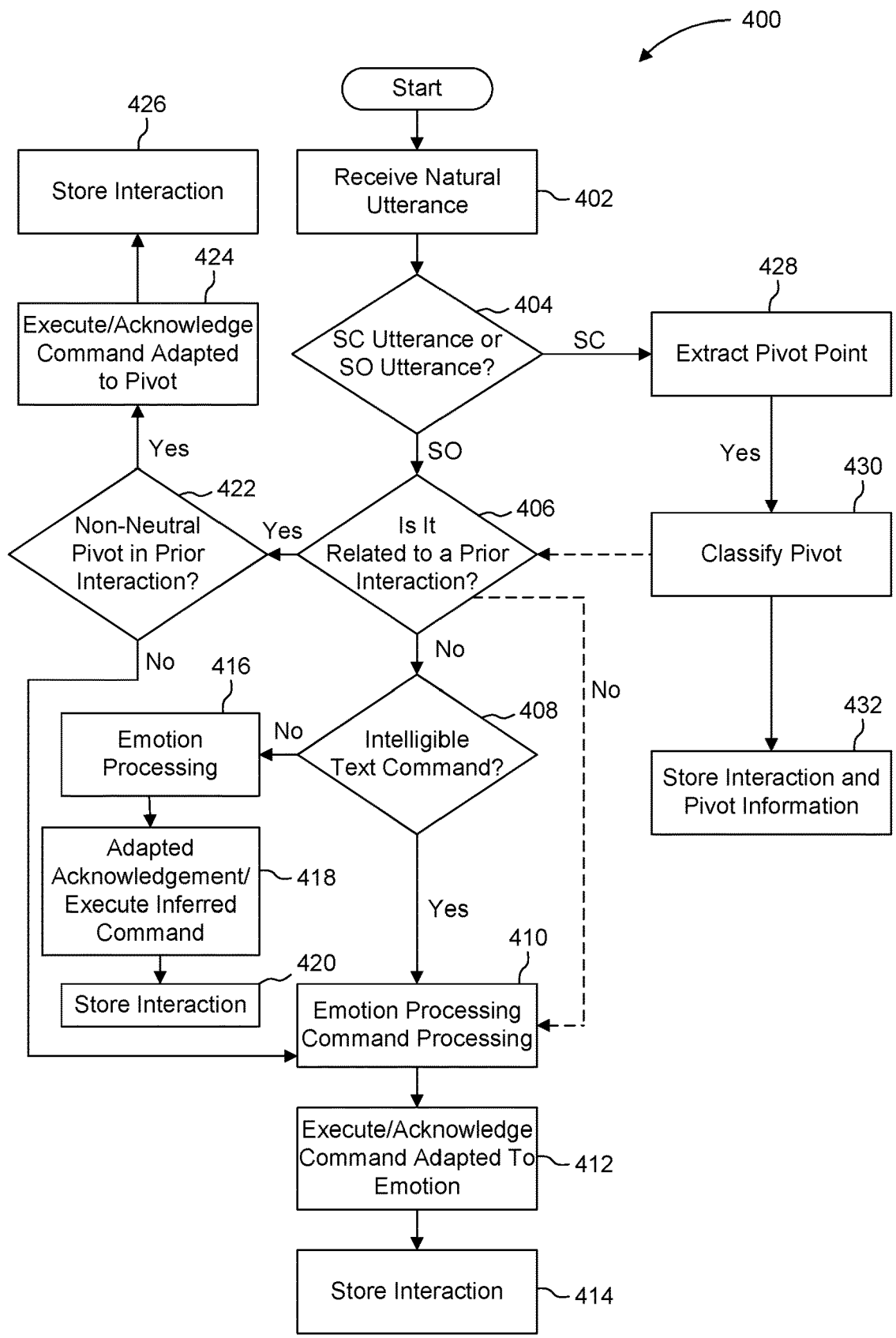
FIG. 7 depicts an example process flow that can be performed using the systems of FIG. 1 or 2.

Referring now to FIG. 7, an example process flow 400 that can be performed using the various emotion-adapted response technologies described herein will now be described.

At block 402 a natural utterance is received.

At block 404 it is determined (e.g., by the conversation detection engine 302) whether the received utterance is a sequence opening utterance or a sequence continuing utterance.

If the utterance is a SO utterance, at block 406 it is determined (e.g., by the response processor 370) whether the SO utterance meets a threshold relatability to a prior interaction sequence.

If the answer from block 406 is "No", then optionally at block 408 it is determined (e.g., by the command extracting unit 154) whether the natural utterance includes an intelligible textual-component based command. In some examples, the process flow 400 bypasses block 408 and, from block 406, the natural utterance undergoes emotion and command processing at block 410.

If the answer from block 408 is "Yes", then at block 410 the natural utterance undergoes emotion processing and command processing by the command processor 150 and the emotion processor 130. Then, at block 412, a response is provided to the natural utterance that includes an action corresponding to the command and an acknowledgement adapted to one or more emotions associated with the natural utterance. In a block 414, the completed interaction is stored for later retrieval and use, e.g., at block 406 of the flow.

If the answer from block 408 is "No", then at block 416 the natural utterance undergoes emotion processing (e.g., by the emotion processor 130). Then, at block 418, a response is provided to the natural utterance that includes an acknowledgement adapted to one or more emotions associated with the natural utterance, and further including one or both of: 1) an indication that a command could not be detected in the natural utterance; and 2) an indication that an inferred command action is being performed. The response at block 418 also includes executing the inferred command. At block 420, the completed interaction is stored for later retrieval and use, e.g., at block 406 of the flow.

If the answer from block 406 is "Yes" then at block 422 it is determined (e.g., by the response processor 370) whether the related prior interaction sequence included a non-neutral pivot, i.e., if it included a pivot classified as either positive or negative.

If the answer from block 422 is "No" then the natural utterance is treated as an utterance that is not related to a prior interaction sequence and the process proceeds with block 410 as described above.

If the answer from block 422 is "Yes" then at a block 424 a response is generated (e.g., by the response processor 370) that is adapted to the non-neutral pivot. The response can include an action and/or an acknowledgment adapted to the non-neutral pivot. In a block 426, the completed interaction is stored for later retrieval and use, e.g., at block 406 of the flow.

If block 404 establishes that the natural utterance includes a SC utterance, then at block 428 it is determined (e.g., by pivot detection engine 304) that the sequence of interactions that includes the SC utterance includes a pivot. The detected pivot is then classified at block 430 as, e.g., positive, negative, or neutral and, at block 432, information about the sequence of interactions and the detected pivot is stored. Optionally, from block 430, the SC utterance is passed to block 406 to undergo response processing as described above, i.e., to respond to the SC utterance, if appropriate. Responding to the SC utterance may not be appropriate if, for example, the SC utterance effectively closes an interaction sequence and therefore does not prompt or warrant a further response.

Figure 8:
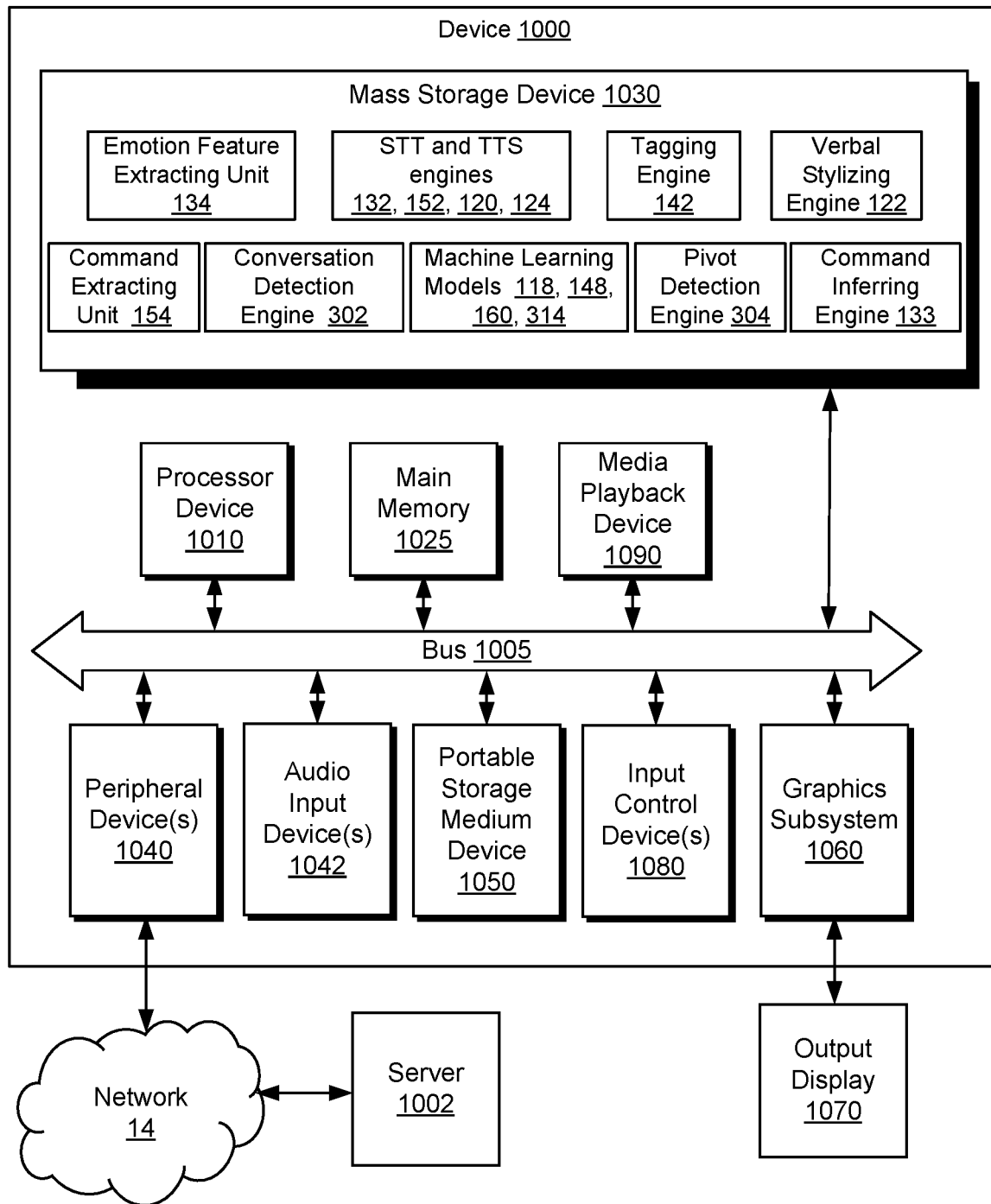
FIG. 8 is a block diagram showing an exemplary device constructed to realize one or more aspects of the example embodiments described herein.

FIG. 8 is a block diagram showing an exemplary device 1000 constructed to realize one or more aspects of the example embodiments described herein. In some examples, the device 1000 corresponds to the user device 102. In these examples, the device 1000 may be connected over the network 14 to one or more servers 1002 or other remote devices. The one or more servers 1002 can include one or more components described below in relation to the device 1000, including a mass storage device and a processor device. That is, various operations and processes described herein can be performed by the cooperation of two or more devices, systems, processes, or combinations thereof. Such a division of operations provides for efficient use of computing resources because servers are generally more powerful than the user device 102.

In other examples, the device 1000 is at least partially remote from the user device 102 and linkable to user device 102 the network 14; thus, all or portions of the device 1000 correspond, in some examples, to components of one or more servers remotely accessible by the user device 102.

The device 1000 includes a processing device 1010. Also included are a main memory 1025 and an interconnect bus 1005. The processor device 1010 may include without limitation a single microprocessor, or may include a plurality of microprocessors for configuring the device 1000 for providing user-specific and/or user device-specific responses to natural utterances that include one or more extractable emotion features. The main memory 1025 stores, among other things, instructions and/or data for execution by the processor device 1010. The main memory 1025 may include banks of dynamic random access memory (DRAM), as well as cache memory.

The device 1000 may further include a mass storage device 1030, peripheral device(s) 1040, audio input device (s) 1042, portable non-transitory storage medium device(s) 1050, input control device(s) 1080, a media playback device 1090, a graphics subsystem 1060, and/or an output display 1070 interface. For explanatory purposes, all components in the device 1000 are shown in FIG. 10 as being coupled via the bus 1005. However, the device 1000 is not so limited. Elements of the device 1000 may be coupled via one or more data transport means. For example, the processor device 1010, and/or the main memory 1025 may be coupled via a local microprocessor bus. The mass storage device 1030, peripheral device(s) 1040, portable storage medium device(s) 1050, and/or graphics subsystem 1060 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is configured for loading contents of the mass storage device 1030 into the main memory 1025. Memory may be embodied as one or more of mass storage device 1030, main memory 1025, or portable storage medium device 1050.

Mass storage device 1030 may additionally store one or more of the data structures (e.g., the indices 136, 137, 138, 146, 308) or function as one or more of the data stores described above that are not local to the user device 102 (e.g., the storage 126, 128, 135, 140, 144, 158, 190, 306). Mass storage device 1030 may also include software that, when executed, causes the device 1000 to perform the features described above. In the illustrated example, the mass storage device 1030 stores the emotion feature extracting unit 134, the TTS and STT engines 132 and 152, 120 and 124, the verbal stylizing engine 122, the command inferring engine 133, the tagging engine 142, the command extracting unit 154, the conversation detection engine 302, the pivot detection engine 304, and the machine learning models 118, 148, 160 and 314.

The portable storage medium device 1050 operates in conjunction with a nonvolatile portable storage medium, such as, for example, a solid state drive (SSD), to input and output data and code to and from the device 1000. In some embodiments, the software for storing information may be stored on a portable storage medium, and may be inputted into the device 1000 via the portable storage medium device 1050. The peripheral device(s) 1040 may include any type of computer support device, such as, for example, an input/output (I/O) interface configured to add additional functionality to the device 1000. For example, the peripheral device(s) 1040 may include a network interface card for interfacing the device 1000 with a network 14. The audio input devices 1042 may be one or more devices configured to receive or obtain audio (e.g., the audio input device 106) and provide a representation of the audio (e.g., as an audio clip or file) as output. Thus, the audio input device(s) 1042 may include one or more microphones or other devices.

The input control device(s) 1080 provide a portion of an interface for the device 1000 (e.g., a portion of the interface 104). The input control device(s) 1080 may include a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 1000 may include the graphics subsystem 1060 and the output display 1070. The output display 1070 may correspond to the display 110 and may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 1060 receives textual and graphical information, and processes the information for output to the output display 1070.

Input control devices 1080 can control the operation and various functions of device 1000. Input control devices 1080 can include any components, circuitry, or logic operative to drive the functionality of device 1000. For example, input control device(s) 1080 can include one or more processors acting under the control of an application.

Each component of the device 1000 may represent a broad category of a computer component of a general and/or special purpose computer. Components of the device 1000 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method, comprising:
  receiving a first natural utterance by a user device, the first natural utterance including a request for playback of media content;
  performing, in response to receiving the first natural utterance, a first action by the user device, the first action including playback of a media content item;
  receiving, via the user device and during the playback of the media content item, a second natural utterance;
  determining that a command is non-extractable from a textual representation of the second natural utterance;
  in response to the determining that the command is non-extractable from the textual representation of the second natural utterance, determining that the second natural utterance includes a non-textual emotion feature and extracting the non-textual emotion feature from the second natural utterance;
  detecting a negative feedback response based on the non-textual emotion feature; and
  in response to the detecting the negative feedback response based on the non-textual emotion feature, performing a second action, by the user device, the second action including stopping playback of the media content item.

2. The method of claim 1, further comprising:
  in response to the detecting the negative feedback response based on the non-textual emotion feature, providing a verbalized acknowledgement of the second natural utterance.

3. The method of claim 2, wherein the verbalized acknowledgement includes a synthesized utterance that is adapted to an emotion corresponding to the emotion feature.

4. The method of claim 3, wherein the synthesized utterance is adapted to the emotion with at least one audible stylization, the at least one audible stylization being one or more of a cadence, a volume, a pitch, a pace, and a tone.

5. The method of claim 1, wherein the non-textual emotion feature is one or more of a cadence, a volume, a pitch, a pace, and a tone of the second natural utterance.

6. The method of claim 1, wherein the detecting the negative feedback response is based on an identity of a user who provided the second natural utterance.

7. The method of claim 6, wherein the detecting the a negative feedback response is based on past interactions between the identified user and the user device.

8. A system, comprising:
  a non-transitory memory storing instructions; and
  at least one processor which, when executing the instructions, operates to:
    receive a first natural utterance by a user device, the first natural utterance including a request for playback of media content;
    perform, in response to receiving the first natural utterance, a first action by the user device, the first action including playback of a media content item;
    receive, via the user device, and during the playback of the media content item, a second natural utterance;
    determine that a command is non-extractable from a textual representation of the second natural utterance;
    in response to the determine that the command is non-extractable from the textual representation of the second natural utterance, determine that the second natural utterance includes a non-textual emotion feature and extract the non-textual emotion feature from the second natural utterance;
    detect a negative feedback response based on the non-textual emotion feature; and
    in response to the detect a negative feedback response based on the non-textual emotion feature, perform a second action by the user device, the second action including stopping playback of the media content item.

9. The system of claim 8, wherein the at least one processor, when executing the instructions, further operates to:
  in response to the detect a negative feedback response based on the non-textual emotion feature, provide a verbalized acknowledgement of the second natural utterance.

10. The system of claim 9, wherein the verbalized acknowledgement includes a synthesized utterance that is adapted to an emotion corresponding to the emotion feature.

11. The system of claim 10, wherein the synthesized utterance is adapted to the emotion with at least one audible stylization, the at least one audible stylization being one or more of a cadence, a volume, a pitch, a pace, and a tone.

12. The system of claim 8, wherein the non-textual emotion feature is one or more of a cadence, a volume, a pitch, a pace, and a tone of the second natural utterance.

13. The system of claim 8, wherein the detect a negative feedback response is based on an identity of a user who provided the nature utterance.

14. The system of claim 13, wherein the detect a negative feedback response is based on past interactions between the identified user and the user device.

* * * * *

UNITED STATES PATENT AND TRADEMARK OFFICE
CERTIFICATE OF CORRECTION

PATENT NO. : 11,081,111 B2
APPLICATION NO. : 16/821140
DATED : August 3, 2021
INVENTOR(S) : Bromand et al.

Page 1 of 1

It is certified that error appears in the above-identified patent and that said Letters Patent is hereby corrected as shown below:

On the Title Page

REFERENCES CITED
U.S. PATENT DOCUMENTS item (56):
Page 3, Line 12, "Cun Ico" should read --Cunico--.

In the Specification

Column 5
Line 64, "repeat!"" should read --repeat!".--.

Column 20
Line 43, "processer" should read --processor--.

In the Claims

Column 26
Line 1, "the a" should read --the--.
Line 52, "nature" should read --natural--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*